United States Patent
Ni et al.

(10) Patent No.: US 8,026,755 B2
(45) Date of Patent: Sep. 27, 2011

(54) SIGNAL OUTPUT APPARATUS, CHARGE PUMP, VOLTAGE DOUBLER AND METHOD FOR OUTPUTTING CURRENT

(75) Inventors: Chenzhi Ni, Zhuhai (CN); Jiang Xiong, Zhuhai (CN)

(73) Assignee: Actions Semiconductor Co., Ltd., Guangdong (CN)

( * ) Notice: Subject to any disclaimer, the term of this patent is extended or adjusted under 35 U.S.C. 154(b) by 0 days.

(21) Appl. No.: 12/666,046

(22) PCT Filed: Mar. 2, 2009

(86) PCT No.: PCT/CN2009/000219
§ 371 (c)(1),
(2), (4) Date: Dec. 22, 2009

(87) PCT Pub. No.: WO2009/109104
PCT Pub. Date: Sep. 11, 2009

(65) Prior Publication Data
US 2010/0182074 A1 Jul. 22, 2010

(30) Foreign Application Priority Data
Mar. 1, 2008 (CN) .......................... 2008 1 0026610

(51) Int. Cl.
*G05F 1/10* (2006.01)

(52) U.S. Cl. ....................................................... 327/537

(58) Field of Classification Search .................. 327/437, 327/536, 589, 208, 210–212
See application file for complete search history.

(56) References Cited

U.S. PATENT DOCUMENTS

| 5,493,486 A | 2/1996 | Connell et al. |
| 6,975,161 B2 | 12/2005 | Yen |
| 7,626,446 B2 * | 12/2009 | Yeh .............................. 327/536 |

FOREIGN PATENT DOCUMENTS

| CN | 1040931 C | 11/1998 |
| CN | 1238953 C | 1/2006 |
| CN | 101247076 A | 8/2008 |
| JP | 2005-12903 A | 1/2005 |

OTHER PUBLICATIONS

"A High-Efficiency CMOS Voltage Doubler," Favrat et al., IEEE Journal Of Solid-State Circuits, vol. 33, No. 3, Mar. 1998.
"A Regulated Charge Pump With Small Ripple Voltage and Fast Start-Up," Lee et al., IEEE Journal Of Solid-State Circuits, vol. 41, No. 2, Feb. 2006.

* cited by examiner

*Primary Examiner* — Hai L Nguyen
(74) *Attorney, Agent, or Firm* — Baker & Hostetler LLP

(57) ABSTRACT

A signal output apparatus, a charge pump, a voltage doubler and a method for outputting a current are provided. The interior circuit of a chip is used to generate an oscillation signal with a swing of 0 to $2 \times V_{IN}$, which drives a charge-pump type voltage doubler using large capacitors outside the chip to output a large current.

18 Claims, 13 Drawing Sheets

SIGNAL OUTPUT APPARATUS, CHARGE PUMP, VOLTAGE DOUBLER AND METHOD FOR OUTPUTTING CURRENT

CROSS-REFERENCE TO RELATED APPLICATIONS

This application is a National Stage of International patent application PCT/CN2009/000219, filed on Mar. 2, 2009, which claims priority to foreign patent application CN 200810026610.3, filed on Mar. 1, 2008.

FIELD OF THE INVENTION

The present invention relates to the field of electronic circuit technologies, and in particular, to a signal output apparatus, a charge pump, a voltage doubler and a method for outputting a current.

BACKGROUND OF THE INVENTION

A charge pump circuit is a circuit for generating a voltage higher than its input voltage. In some interface circuits, an output voltage higher than the input voltage and a large output current are required to be provided, thus a charge pump-type booster circuit, which can generate a large current output, is needed in the interface circuit chip. For example, in a Universal Serial Bus On-the-Go (USB OTG) interface circuit, a vbus in a cable is required to be driven to a voltage over 4.75V, and a current over 8 mA should be provided to a Self-Powered Device or a current higher than 100 mA should be provided to a Bus-Powered Device.

In A High-Efficiency CMOS Voltage Doubler, Pierre Favrat, et al., IEEE JOURNAL OF SOLID-STATE CIRCUITS, Vol. 33, No. 3, MARCH 1998, a structure of a charge pump is described. FIG. 1 is a schematic diagram of the circuit structure of the charge pump, in which a clock signal CK changes periodically between an input voltage $V_{IN}$ and 0 and a CKN is the inverted clock of CK. After an operation time long enough, an output voltage $V_{OUT}$ will be finally stabilized at about $2\times V_{IN}$. However, when a current with order of magnitude of tens or even hundreds mA is provided by using the charge pump shown in FIG. 1, the capacitance of the capacitor in the charge pump will be very large (with the order of magnitude of about 0.1 g), thereby causing that the capacitor only can be connected to the charge pump circuit in a chip pin mode from the outside of the charge pump circuit chip, thus one or more of nodes CP1 and CP2 will be pins for the chip to connect to the outside capacitor. In the practical application using standard CMOS manufacturing process, N-type metal oxide semiconductor (NMOS) N1$a$ and N2$a$ may be destroyed due to electrostatic discharge (ESD) or latchup, because their bulks have no independent wells for protection, and their sources or drains and their gates are connected to high voltage chip pins.

In A Regulated Charge Pump With Small Ripple Voltage and Fast Start-Up, Jae-Youl Lee, et al., IEEE JOURNAL OF SOLID-STATE CIRCUITS, Vol. 41, NO. 2, FEBRUARY 2006, another structure of a charge pump is disclosed. FIG. 2 is a schematic diagram showing the circuit structure of the charge pump. There exist the following problems in the structure of this charge pump.

1) The drain and gate of a P-type metal oxide semiconductor (PMOS) P2$b$ are connected with each other, which results in that, when a capacitor C2$b$ is charged, the ascending extent of voltage on a node CP2 is limited, and the charges that can be obtained by the charge pump from the input voltage $V_{IN}$ in each period is limited. Therefore, such a structure greatly limits the quantity of charges that can be output from the node CP2 at a high potential (about $2\times V_{IN}$). If providing a large current output by using such a structure, a chip with a large area is needed, and the cost is relatively high.

2) Because a bulk of an output switch P3$b$ is connected with an output node $V_{OUT}$, when other circuits connected with the $V_{OUT}$ requires to drive $V_{OUT}$ to logic 0 level when the charge pump is not at work, the PN junction between the P-type source (connected with the node CP2) and the N well (connected with the bulk) of the P3$b$ will be forward conducting, thus the potential of $V_{OUT}$ can only be driven to $V_{IN}$-Vth$_{PMOS}$-Vth$_{PN}$ at the lowest (where Vth$_{PMOS}$ is the cut-in voltage of the P-type metal oxide semiconductor, and Vth$_{PN}$ is the forward conducting voltage of the PN junction), and cannot be normally driven to logic 0 level by the external circuit.

CN Patent NO. ZL 02157151.1 discloses a charge pump and a voltage doubler using the same. A schematic diagram of the whole circuit structure of the voltage doubler is as shown in FIG. 3, where CK and CKN are a pair of oscillation signals with opposite phases and a swing of $0 \sim V_{IN}$. The operating principle of the charge pump circuit is as follows.

It is hypothesized that, at the initial state, the potential of the node CKN is $V_{IN}$ and the potential of the node CK is 0, then a module 2 outputs a hclk1 (the initial potential of a signal hclk2 output by the module 2 is about $V_{IN}$) signal with the potential of 0 to a module 1, so that the potential of the output signal CP1 of module 1 is pulled up to $V_{IN}$ via a switch P1$c$, while the potential of the output signal CP2 of module 1 is raised to $V_{IN}$ due to the capacitance characteristic. Then the potential of the node CKN is inverted to 0 and the potential of the node CK is inverted to $V_{IN}$, and the potential of the output signal CP1 of module 1 is raised to $2\times V_{IN}$ due to the capacitance characteristic, the module 1 outputs the CP1 signal with the potential of $2\times V_{IN}$ to the module 2, the module 2 generates an hclk1 signal with a potential of $2\times V_{IN}$ by using the CP1 signal with the potential of $2\times V_{IN}$ output by the module 1 and outputs the hclk1 signal to the module 1, so that the CP1 signal output by the module 1 keeps at the potential of $2\times V_{IN}$; furthermore, the module 2 further outputs an hclk2 signal with a potential of 0 to the module 1, so that the CP2 signal output by the module 1 is again raised to the potential of $V_{IN}$ (at the moment the potential of the node CKN is inverted to 0, the potential of the CP2 signal output by the module 1 is pulled down to 0 due to the capacitance characteristic). Subsequently, by the same token, when the potentials of the nodes CK and CKN are inverted between 0 and $V_{IN}$, two output signals CP1 and CP2 with opposite phases may vary periodically in a range of $V_{IN}$ to $2\times V_{IN}$.

The solution described in CN Patent NO. ZL 02157151.1 has the following disadvantages:

1) In addition to providing charges to the $V_{OUT}$, the output signals CP1 and CP2 of the module 1 act as the input signals of the module 2 to make the potentials of the output signals hclk1 and hclk2 of the module 2 (at the same time, they are also the input signals of the module 1) change from 0 to $2\times V_{IN}$ and to make the potentials of the nodes a and b of the module 2 change from 0 to $V_{IN}$, thus the charges stored by the capacitors C1$c$ and C2$c$ are wasted and the output charges are reduced;

2) When a circuit is required to output a large current (a current of tens or even hundreds mA) when the output voltage $V_{OUT}$ is higher than the input voltage $V_{IN}$, the capacitance of the capacitor C1$c$ or C2$c$ would be of the order of magnitude of about 0.1 uF, thus the capacitor can only be connected from the outside of the circuit chip. At this point, the upper and lower plates of the capacitor and the $V_{OUT}$ are high voltage input/output pins of the chip. The metal oxide semiconductor would readily subject to the destruction of electrostatic discharge or latchup when the high voltage input/output pins (for example, CP1, CP2 and $V_{OUT}$) of the chip are connected directly to the gate, the source and the drain of the metal oxide semiconductor (MOS) simultaneously;

3) Because the CK and CKN are an operation clock signal and an inverted operation clock signal with an opposite phase to the operation clock signal, respectively, the charge loss due to the clock level inversion cannot be avoided, and the efficiency of the energy output of the $V_{OUT}$ is relatively low. Especially, when the clock signal is inverted, a problem of charge loss may arise because a breakover current from the $V_{IN}$ to the GND may flow through a driver that provides charges to the lower plate of the capacitor C1c or C2c; and when the clock signal is inverted, a problem of charge loss may arise because the switches P6c and P5c and the switches P1c and P8c are conducting at the same time, which causes the charges to flow back from the CP1 (or CP2) with a high potential to the CP2 (or CP1) with a low potential. Furthermore, because the current that flows through each metal oxide semiconductor (MOS) is large in the application of outputting a large current, and the parasitic capacitance is relatively large due to the size of each MOS is relatively large, thus the ascending time and the descending time of the clock signal level inversion is relatively long, thereby causing the above two problems of charge loss to be serious. Moreover, because it is limited by the structural characteristic of this solution, even if the CK and CKN are modified as two-phase non-overlap clock signals, the above two problems of charge loss still cannot be solved at the same time.

SUMMARY OF THE INVENTION

The embodiments of the invention provide a signal output apparatus, a charge pump, a voltage doubler and a method for outputting a current, thereby avoid that, when a large current is output in the case that the output voltage $V_{OUT}$ is higher than the input voltage $V_{IN}$, the MOS is fragile to be destroyed by the electrostatic discharge or latchup and the efficiency of energy output of the circuit is low in the prior art.

An embodiment of the invention provides a signal output apparatus, including:

a first signal generating unit, adapted to generate a first oscillation signal with a swing of input voltage $V_{IN}$ to $2 \times V_{IN}$ and a second oscillation signal with a swing of 0 to $V_{IN}$ and a phase the same as that of the first oscillation signal; and a second signal generating unit, adapted to take the first oscillation signal and the second oscillation signal as triggering signals, convert the input voltage to a first output signal with a swing of 0 to $2 \times V_{IN}$ and output the first output signal, wherein the phases of the first output signal and the first oscillation signal are the same.

An embodiment of the invention provides a charge pump, including:

a signal output module, adapted to output a first output signal with a swing of 0 to $2 \times V_{IN}$; and a charge storage module, adapted to take the first output signal as a triggering signal to generate two states, wherein one state is to charge one plate of a capacitor by an input voltage $V_{IN}$, and the other state is to provide a voltage higher than 0 volt to the other plate of the capacitor.

An embodiment of the invention provides a voltage doubler, including:

a signal output module, adapted to output a first output signal with a swing of 0 to $2 \times V_{IN}$, and a first oscillation signal and a third oscillation signal with the same swing of $V_{IN}$ to $2 \times V_{IN}$ but with opposite phases;

a charge storage module, adapted to take the first output signal as a triggering signal to generate two states, wherein one state is to charge one plate of a first capacitor by an input voltage $V_{IN}$, and the other state is to provide a voltage higher than 0 volt to the other plate of the first capacitor; and a current output switch module, adapted to take the first oscillation signal and the third oscillation signal as triggering signals and output the charges stored in the charge storage module via the first capacitor.

An embodiment of the invention provides a method for outputting a current, including:

generating a first oscillation signal with a swing of $V_{IN}$ to $2 \times V_{IN}$, a second oscillation signal with a swing of 0 to $V_{IN}$ and a phase the same as that of the first oscillation signal, and a third oscillation signal with a swing the same as that of the first oscillation signal but with an opposite phase;

taking the first oscillation signal and the second oscillation signal as triggering signals, converting the input voltage to a first output signal with a swing of 0 to $2 \times V_{IN}$ and outputting the first output signal, wherein the phases of the first output signal and the first oscillation signal are the same;

taking the first output signal as a triggering signal to generate two states, wherein one state is to charge one plate of a capacitor by the input voltage $V_{IN}$, and the other state is to provide a voltage higher than 0 volt to the other plate of the capacitor; and taking the first oscillation signal and the third oscillation signal as triggering signals to output the charges on the plate of the capacitor.

In the solutions provided in the embodiments of the invention, a charge pump-type voltage doubler using large capacitors outside the chip is driven by an oscillation signal with a swing of 0 to $2 \times V_{IN}$ that is generated by an interior circuit of the chip, so that a large current can be output, and an MOS device is destroyed by the electrostatic discharge or latchup due to high voltage pins is avoided, thereby improving the efficiency of energy output of the circuit.

DETAILED DESCRIPTION

The invention will now be described in detail in conjunction with the drawings.

Figure 1:
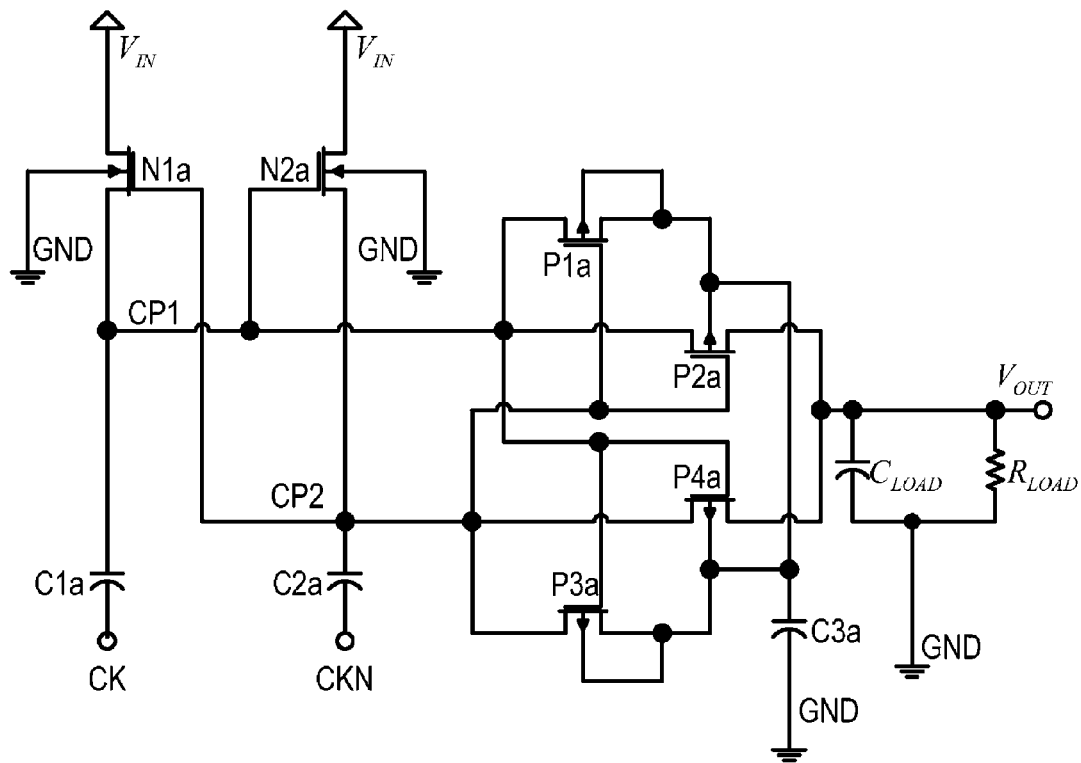
FIG. 1 is a schematic diagram showing a circuit structure of a charge pump in the prior art.
Figure 2:
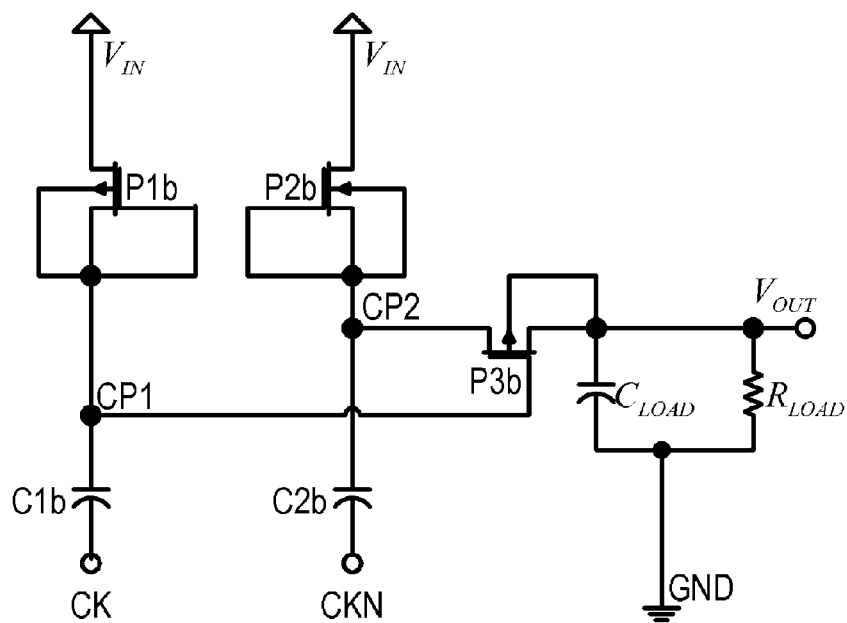
FIG. 2 is a schematic diagram showing a circuit structure of another charge pump in the prior art.
Figure 3:
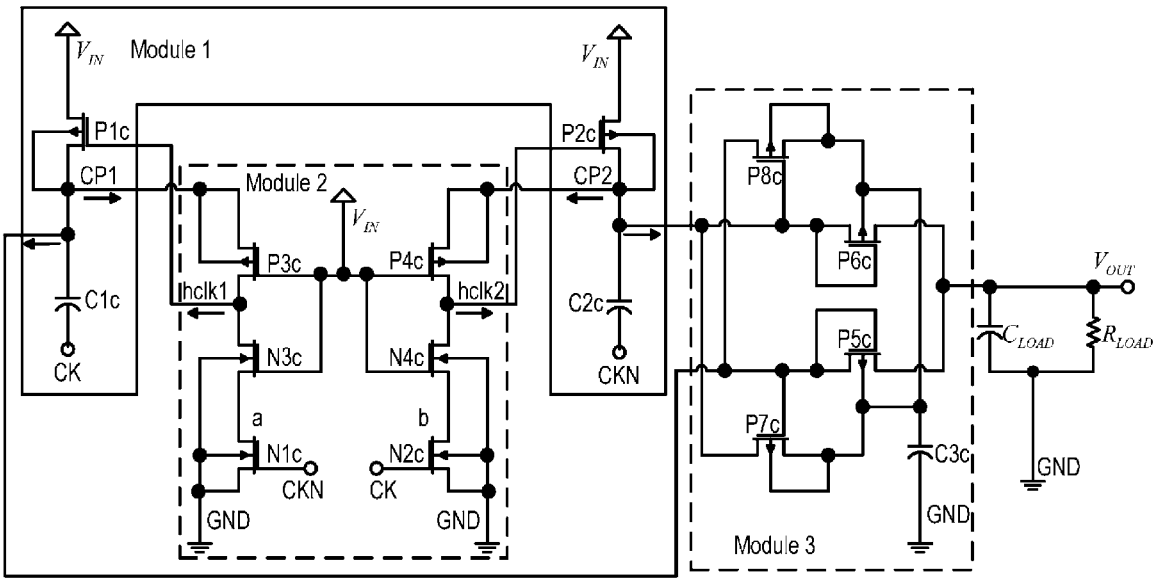
FIG. 3 is a schematic diagram showing a circuit structure of a voltage doubler in the prior art.
Figure 4:
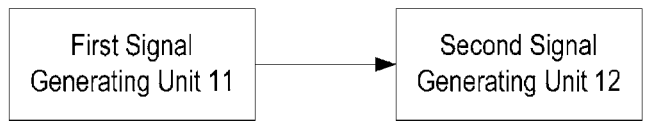
FIG. 4 is a structural representation of a signal output apparatus according to Embodiment 1 of the invention.

FIG. 4 shows a structural representation of a signal output apparatus according to Embodiment 1 of the invention. The signal output apparatus is adapted to output a periodically varying signal with a swing in a range of 0 to $2 \times V_{IN}$. As shown in the figure, the signal output apparatus includes: a first signal generating unit 11 and a second signal generating unit 12. The first signal generating unit 11 is adapted to generate a first oscillation signal with a swing of input voltage $V_{IN}$ to $2 \times V_{IN}$, and a second oscillation signal with a swing of 0 to $V_{IN}$ and a phase the same as that of the first oscillation signal; the second signal generating unit 12 is adapted to take the first oscillation signal and the second oscillation signal as triggering signals, and convert the input voltage to a first output signal with a swing of 0 to $2 \times V_{IN}$ and output the first output signal, where the phase of the first output signal is the same as that of the first oscillation signal.

Figure 5:
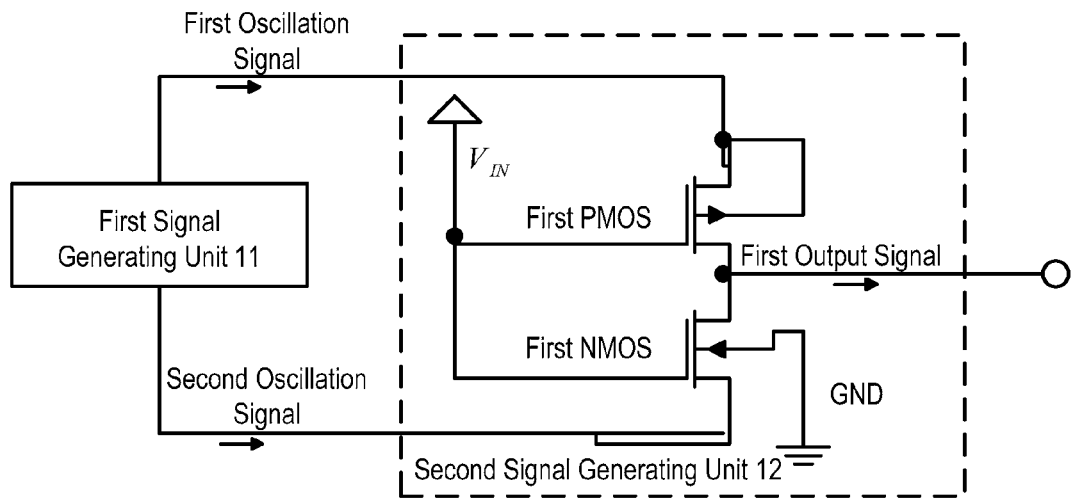
FIG. 5 is a schematic diagram showing a circuit structure of a signal output apparatus according to Embodiment 1 of the invention.

Specifically, the second signal generating unit 12 includes various devices, taking an MOS transistor as an example, the second generating unit 12 may include a first PMOS and a first NMOS. FIG. 5 is a schematic diagram showing the circuit structure of the signal output apparatus according to Embodiment 1 of the invention, where the gate of the first PMOS is connected to an input voltage $V_{IN}$, and the source or the drain of the first PMOS is connected to the bulk and receives a first oscillation signal generated by the first signal generating unit 11; the source or the drain of the first NMOS receives a second oscillation signal generated by the first signal generating unit 11, the bulk of the first NMOS is grounded, and the gate of the first NMOS is connected to the input voltage $V_{IN}$; one of the source and the drain of the first PMOS that is not connected to the bulk is connected with one of the source and the drain of the first NMOS that does not receive the second oscillation signal, and outputs a first output signal at the connection point.

Additionally, the first signal generating unit 11 may also generate a third oscillation signal with an opposite phase but the same swing as the first oscillation signal, the function of which will be described in the subsequent embodiments.

The first signal generating unit 11 may be composed of various circuits. Two circuit structures of Embodiment 1 will now be provided by respectively taking Embodiment 2 and Embodiment 3 as an example, and the operating process thereof will be illustrated via the description of the circuit structures.

Figure 6:
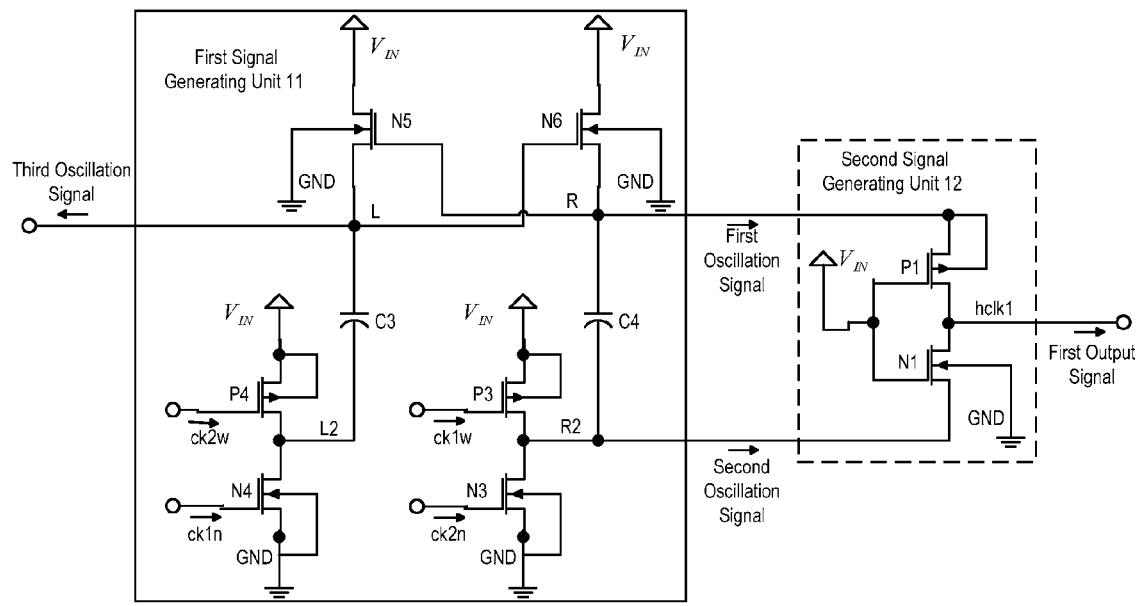
FIG. 6 is a schematic diagram showing a circuit structure of a signal output apparatus according to Embodiment 2 of the invention.

FIG. 6 shows a schematic diagram showing the circuit structure of the signal output apparatus according to Embodiment 2 of the invention. In the figure, P1 is the first PMOS, and N1 is the first NMOS.

The first signal generating unit 11 may generate one or more first oscillation signals with a swing of $V_{IN}$ to $2 \times V_{IN}$ and second oscillation signals with a swing of 0 to $V_{IN}$ as desired, and the phases of these oscillation signals are optional. Because the unit does not need to output a large current, the capacitance in the unit may be small, thus an integrated capacitor inside the chip may be used, without occupying the chip pins. The operating process of the first signal generating unit 11 is as follows.

It is hypothesized that, initially, the voltage differences between the upper and lower plates of the capacitors C3 and C4 are both 0, the phases of the voltages output by the node L2 and the node R2 are opposite, and the two voltages are oscillation signals with a swing of 0 to $V_{IN}$. When the potential of the node L2 is 0 and the potential of the R2 is $V_{IN}$, the voltage differences between the upper and lower plates of the capacitors C4 and C3 are still kept at 0 volt due to the capacitance characteristic, thus initially, the potential of the node L is 0 volt, and the potential of the node R is raised to $V_{IN}$. Then the N5 is conducting, the capacitor C3 is charged by the input voltage $V_{IN}$, and the potential of the node L is pulled up to $V_{IN}$. When the potential of the node L2 is inverted to $V_{IN}$ and the potential of the node R2 is inverted to 0, because the voltage differences between the upper and lower plates of the capacitors C3 and C4 can not be changed at the moment the oscillation signals are inverted, at the moment after inversion, the potential of the node L is pushed up to a voltage of about $2 \times V_{IN}$ due to the ascending of the potential of the node L2, and the potential of the node R is pulled down to 0 due to the descending of the potential of the node R2. In such a case, the N5 is not conducting, while the N6 is conducting because the potential of the gate L is higher than the potential of the node R, thus the potential of the node R is also pulled up to $V_{IN}$. Thereafter, according to the above principle, the voltages of the nodes L and R are opposite phase voltages, and the potentials thereof vary periodically in a range of $V_{IN}$ to about $2 \times V_{IN}$ respectively; the voltages of the nodes L2 and R2 are also opposite phase voltages, and the potentials thereof vary periodically in a range of 0 to $V_{IN}$ respectively. In this embodiment, the oscillation signals output by the nodes R and R2 are taken as the first oscillation signal and the second oscillation signal respectively, and the oscillation signal output by the node L is taken as the third oscillation signal.

The voltage output by the node L2 is obtained via the P4 and N4 shown in FIG. 6, the gate of P4 is connected to a clock signal ck2w, and the gate of N4 receives a clock signal ck1n; the voltage output by the node R2 is obtained via the P3 and N3 shown in FIG. 6, the gate of P3 is connected to a clock signal ck1w, and the gate of N3 receives a clock signal ck2n, where the ck1w and the ck2w are two-phase non-overlap oscillation signals, the ck1n and the ck2n are two-phase non-overlap oscillation signals, the ck2n and the ck2w are phase-inverted oscillation signals, and the ck1n and the ck1w are phase-inverted oscillation signals.

The role of the second signal generating unit 12 in FIG. 6 is to generate an oscillation signal with a swing of 0 to about $2 \times V_{IN}$ by using the first oscillation signal output by the output node R of the first signal generating unit 11 and the second oscillation signal output by the output node R2. A NMOS transistor N1 and a PMOS transistor P1 exist in the circuit structure of the second signal generating unit 12, the first oscillation signal from the node R is output to the source and the bulk of P1, the second oscillation signal from the node R2 is output to the source of N1, the gates of P1 and N1 are connected to the input voltage $V_{IN}$, the bulk of N1 is grounded, the drain of P1 is connected with the drain of N1, and an output signal with a swing of 0 to about $2 \times V_{IN}$ is output. The specific operating process thereof is as follows.

When the potential of the R2 is 0 and the potential of the R is $V_{IN}$, the N1 is conducting, while the P1 is blocking, and the potential of the first output signal (labelled as hclk1 in this embodiment) is pulled down to 0 by the N1; when the potential of the R2 is $V_{IN}$ and the potential of the R is about $2 \times V_{IN}$, N1 is blocking while P1 is conducting, and the potential of the hclk1 is pulled up to about $2 \times V_{IN}$ by the P1. Thereafter, according to the above principle, the hclk1 oscillates in a range of 0 to about $2 \times V_{IN}$.

Figure 7:
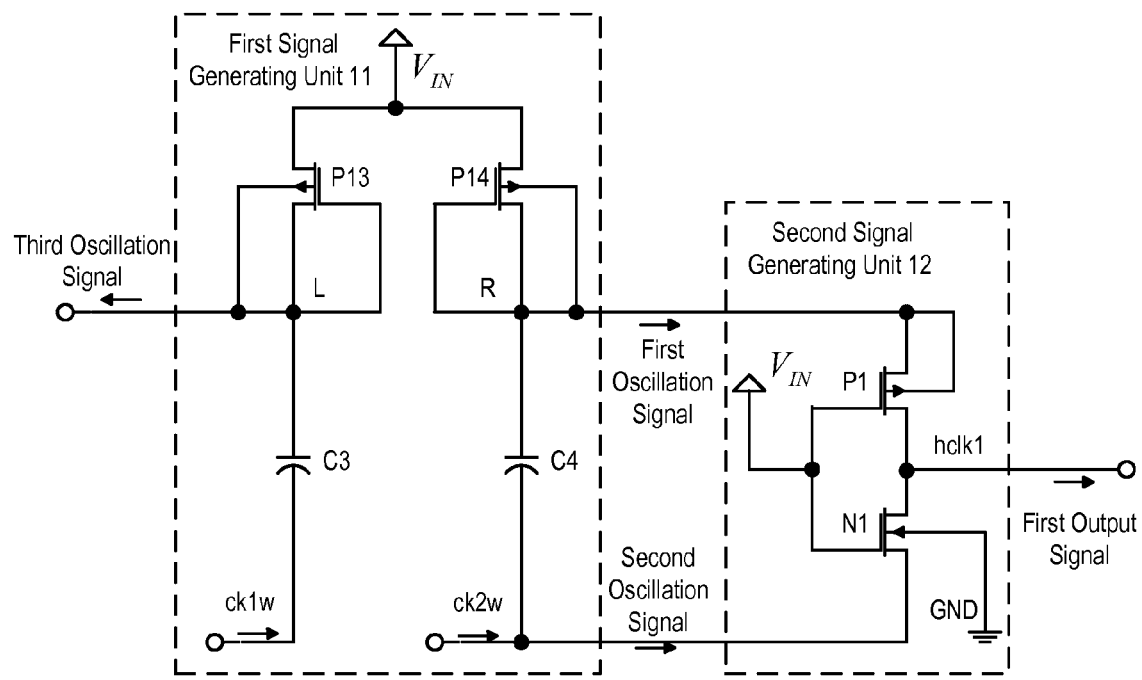
FIG. 7 is a schematic diagram showing a circuit structure of a signal output apparatus according to Embodiment 3 of the invention.

Embodiment 3 of the invention further provides a schematic diagram showing the circuit structure of another signal output apparatus. As shown in FIG. 7, P1 in the figure is the first PMOS, and N1 is the first NMOS. The operating process of the first signal generating unit 11 is as follows: it is hypothesized that, initially, the voltage differences between the upper and lower plates of the capacitors C3 and C4 are both 0, and nodes ck1w and ck2w are two-phase non-overlap clock signals with opposite phases and a swing of 0 volt to $V_{IN}$ volt. To simplify the description of the operating principle, the high level dead zone between the potentials of the nodes ck1w and ck2w is ignored (that is, it is hypothesized that Tb−Ta=0), and such a simplification will not influence the main operating principle. When the potential of the node ck1w is 0, the potential of the ck2w is $V_{IN}$. The voltage differences between the upper and lower plates of the capacitors C4 and C3 are still kept at 0 due to the capacitance characteristic, thus the potential of the node L is 0, while the potential of the node R is raised to $V_{IN}$. Then, the P13 is conducting, the capacitor C3 is charged by the input voltage $V_{IN}$, and the potential of the node L is pulled up to about $V_{IN}$. Then, when the potential of the node ck1w is inverted to $V_{IN}$ and the potential of the node ck2w is inverted to 0, because the voltage differences between the upper and lower plates of the capacitors C3 and C4 can not be changed at the moment the clock signals are inverted, at the moment after inversion, the potential of the node L is pushed up to the potential of about $2 \times V_{IN}$ due to the ascending of the potential of the node ck1w, and the potential of the node R is pulled down to 0 due to the descending of the potential of the node ck2w. In such a case, the P13 is not conducting, while the P14 is conducting because the potential of the gate R is lower than $V_{IN}$, thus the capacitor C4 is charged by the input voltage $V_{IN}$, and the potential of the node R is also pulled up to about $V_{IN}$. Thereafter, according to the above principle, the potentials of the nodes L and R will vary periodically in a range of $V_{IN}$ to about $2 \times V_{IN}$ respectively. In this embodiment, the signal output by the node R is taken as the first oscillation signal, the signal output by the node ck2w is taken as the second oscillation signal, and the oscillation signal output by the node L is taken as the third oscillation signal.

The operating principle of the second signal generating unit 12 is the same as that in Embodiment 2. When the potential of the ck2w is 0 and the potential of the R is $V_{IN}$, the N1 is conducting, while the P1 is blocking, the potential of the first output signal (labelled as hclk1 in this embodiment) is pulled down to 0 by the N1; when the potential of the ck2w is $V_{IN}$ and the potential of the R is about $2 \times V_{IN}$, the N1 is blocking while the P1 is conducting, and the potential of the hclk1 is pulled up to about $2 \times V_{IN}$ by the P1. Thereafter, according to the above principle, hclk1 oscillates in a range of 0 to about $2 \times V_{IN}$.

According to the description of Embodiment 1 to Embodiment 3, a signal output apparatus for independently generating an oscillation signal with a swing of 0 to $2 \times V_{IN}$ is provided. The signal output apparatus provided in these embodiments has a broad application range, for example, it can be used in an analog digital converter (ADC), an apparatus for converting a low voltage digital signal to a high voltage digital signal, a charge pump and a voltage doubler.

Figure 8:
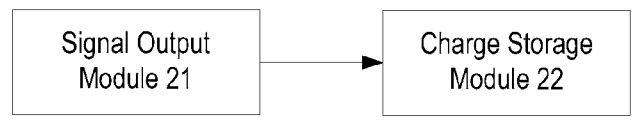
FIG. 8 is a structural representation of a charge pump according to Embodiment 4 of the invention.

FIG. 8 shows a structural representation of a charge pump according to Embodiment 4 of the invention. The charge pump includes a signal output module 21 and a charge storage module 22, where the signal output module 21 is adapted to output a first output signal with a swing of 0 to $2 \times V_{IN}$, the signal output module 21 may be the signal output apparatus described in Embodiment 1 to Embodiment 3, and may also have other circuit structures; the charge storage module 22 is adapted to take the first output signal as a triggering signal to generate two states, where one state is to charge one plate of the capacitor by the input voltage, and the other state is to provide a voltage higher than 0 volt to the other plate of the capacitor.

Figure 9:
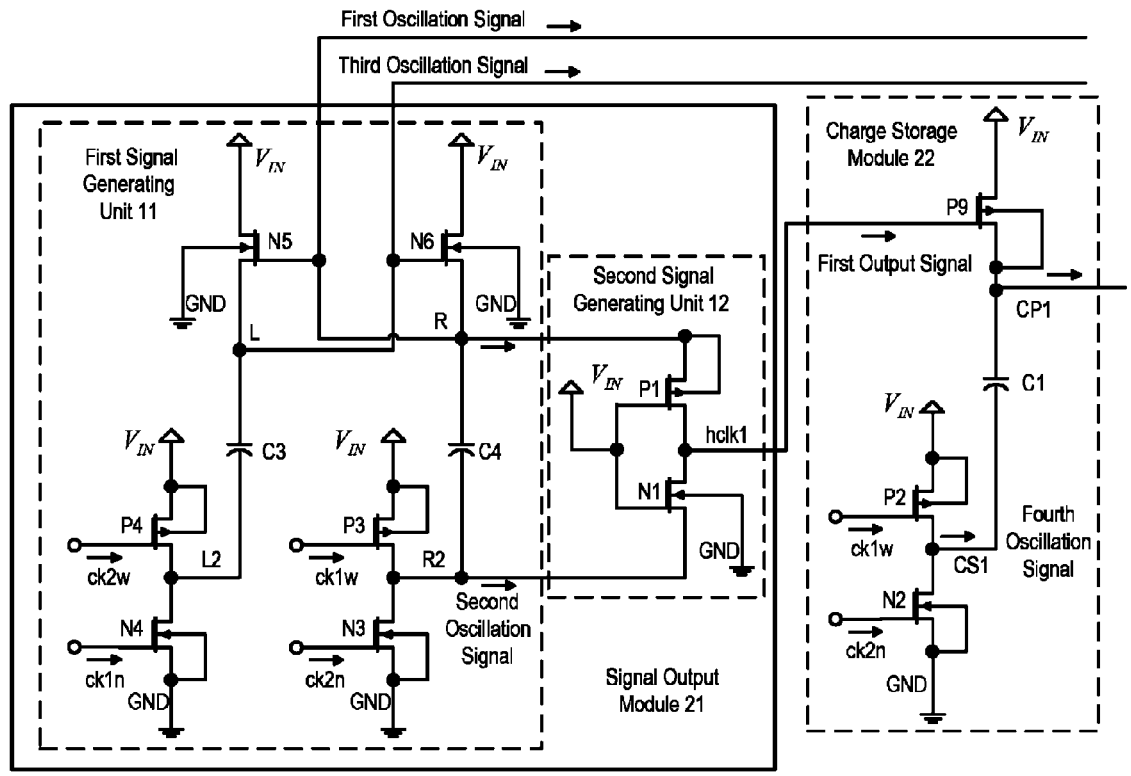
FIG. 9 is a schematic diagram showing a circuit structure of a charge pump according to Embodiment 5 of the invention.

It is hypothesized that the signal output module 21 is the signal output apparatus in Embodiment 2, as shown in FIG. 9. FIG. 9 is a schematic diagram showing the circuit structure of the charge pump according to Embodiment 5 of the invention. The charge storage module 22 includes a ninth PMOS (P9 in FIG. 9) and a first capacitor (C1 in FIG. 9), where the gate of the ninth PMOS receives the first output signal, one of the source and the drain of the ninth PMOS is connected to the input voltage $V_{IN}$, and the other of the source and the drain of the ninth PMOS is connected to the bulk of the ninth PMOS; the upper plate of the first capacitor is connected with one of the source and the drain of the ninth PMOS that is connected with the bulk, and the lower plate of the first capacitor receives a fourth oscillation signal with a swing of 0 to $V_{IN}$, where the phase of the fourth oscillation signal is the same as that of the first output signal.

In order to improve the efficiency of energy output of the charge pump, the fourth oscillation signal may also be obtained via the following structure.

The charge storage module 22 further includes a second PMOS (P2 in FIG. 9) and a second NMOS (N2 in FIG. 9), where the first clock signal ck1w is the input for the gate of the second PMOS, and the input voltage $V_{IN}$ is the input for the source and the bulk of the second PMOS; the second clock signal ck2n is the input for the gate of the second NMOS, the source and the bulk of the second NMOS are grounded, the drain of the second NMOS is connected with the drain of the second PMOS, and the connection point CS1 outputs the fourth oscillation signal.

The P9 charging the capacitor C1 in the charge storage module 22 uses the first output signal with a swing of 0 to about $2 \times V_{IN}$ that is output by the signal output apparatus, i.e., the hclk1. In a half period of charging, the potential of the node hclk1 is 0, P9 is conducting, the first capacitor C1 is charged by the input voltage $V_{IN}$, and the potential of the upper plate CP1 of C1 may reach up to $V_{IN}$; furthermore, because the potential of the lower plate CS1 of C1 is 0 at this point, the capacitor may be filled with charges up to the hilt.

However, in a half period of discharging, the potential of the lower plate CS1 of C1 is $V_{IN}$, because the voltage difference between the upper and lower plates of C1 can not be changed at the moment the oscillation signal is inverted, at the moment after inversion, the upper plate CP1 of C1 will be pushed up to a voltage of about $2 \times V_{IN}$ due to the ascending of the potential of the lower plate CS1.

In this embodiment, the lower plate of the C1 may be connected directly with the entity that provides a fourth oscillation signal with a swing of 0 to $V_{IN}$. For example, in FIG. 9, the P2 and the N2 constitute the entity that generates the fourth oscillation signal, where the P2 and the N2 are controlled by using two-phase non-overlap clock signals ck1w and ck2n, thus the breakover current from the input voltage $V_{IN}$ to the ground, which is generated due to the P2 and the N2 are conducting at the same time at the moment the clock signal level is inverted, may be eliminated, the power consumption may be reduced, and the efficiency of the energy output of the circuit may be improved. In the specific application of this embodiment, because the sizes of the MOS transistors P2 and N2 are larger than the sizes of the MOS transistors P4, N4, P3 and N3, the charge amount output by the output node CS1 is greater than the charge amount output by the node L2 or the node R2.

The charge pump in FIG. 9 further includes a first signal generating unit 11 and a second signal generating unit 12 in the signal output module 21.

The operating process of the first signal generating unit 11 is as follows.

It is hypothesized that, initially, the voltage differences between the upper and lower plates of the capacitors C3 and C4 are both 0, the phases of the voltages output by the node L2 and the node R2 are opposite, and the two voltages are oscillation signals with a swing of 0 to $V_{IN}$. When the potential of the node L2 is 0 and the potential of the R2 is $V_{IN}$, the voltage differences between the upper and lower plates of the capacitors C4 and C3 are still kept at 0 volt due to the capacitance characteristic, thus initially, the potential of the node L is 0 volt, and the potential of the node R is raised to $V_{IN}$. Then the N5 is conducting, the capacitor C3 is charged by the input voltage $V_{IN}$, and the potential of the node L is pulled up to $V_{IN}$. When the potential of the node L2 is inverted to $V_{IN}$ and the potential of the node R2 is inverted to 0, because the voltage differences between the upper and lower plates of the capacitors C3 and C4 can not be changed at the moment the oscillation signals are inverted, at the moment after inversion, the potential of the node L is pushed up to a voltage of about $2 \times V_{IN}$ due to the ascending of the potential of the node L2, and the potential of the node R is pulled down to 0 due to the descending of the potential of the node R2. In such a case, the N5 is not conducting, while the N6 is conducting because the potential of the gate L is higher than the potential of the node R, thus the potential of the node R is also pulled up to $V_{IN}$. Thereafter, according to the above principle, the voltages of the nodes L and R are opposite phase voltages, and the potentials thereof vary periodically in a range of $V_{IN}$ to about $2 \times V_{IN}$ respectively; the voltages of the nodes L2 and R2 are also opposite phase voltages, and the potentials thereof vary periodically in a range of 0 to $V_{IN}$ respectively. In this embodiment, the oscillation signals output by the nodes R and R2 are taken as the first oscillation signal and the second oscillation signal, and the oscillation signal output by the node L is taken as the third oscillation signal.

The voltage output by the node L2 is obtained via the P4 and N4 in FIG. 9, the gate of P4 receives a clock signal ck2w, and the gate of N4 receives a clock signal ck1n; the voltage output by the node R2 is obtained via the P3 and N3 in FIG. 9, the gate of P3 receives a clock signal ck1w, and the gate of N3 receives a clock signal ck2n, where in the first signal generating unit 11, the ck1w and the ck2w are two-phase non-overlap oscillation signals, the ck1n and the ck2n are two-phase non-overlap oscillation signals, the ck2n and the ck2w are phase-inverted oscillation signals, and the ck1n and the ck1w are phase-inverted oscillation signals.

The specific operating process of the second signal generating unit 12 is as follows.

When the potential of the R2 is 0 and the potential of the R is $V_{IN}$, the N1 is conducting, while the P1 is blocking, and the potential of the first output signal is pulled down to 0 by the N1; when the potential of the R2 is $V_{IN}$ and the potential of the R is about $2 \times V_{IN}$, the N1 is blocking while the P1 is conducting, and the potential of the hclk1 is pulled up to about $2 \times V_{IN}$ by the P1. Thereafter, according to the above principle, the hclk1 oscillates in a range of 0 to about $2 \times V_{IN}$.

Figure 10:
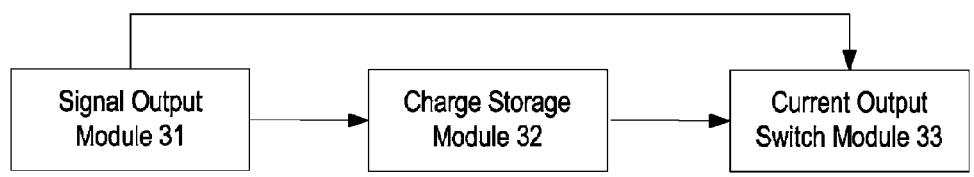
FIG. 10 is a structural representation of a voltage doubler according to Embodiment 6 of the invention.

Embodiment 6 of the invention further provides a voltage doubler, the structural representation of which is as shown in FIG. 10. The signal output module 31 in the figure may be the signal output apparatus described in Embodiment 1 to Embodiment 3, and may also be modules obtained by the other circuit connection modes that can output the first output signal with a swing of 0 to $2 \times V_{IN}$ and the first oscillation signal and the third oscillation signal with a swing of $V_{IN}$ to $2 \times V_{IN}$ but with opposite phases, as in Embodiment 1 to Embodiment 3.

The charge storage module 32 in the voltage doubler may be the same as the charge storage module 22 of the charge pump in Embodiments 4 and 5, and may also be modules obtained by the other circuit connection modes that can take the first output signal as a triggering signal to generate two states, where one state is to charge one plate of the capacitor via the input voltage $V_{IN}$, and the other state is to provide a voltage higher than 0 volt to the other plate of the capacitor.

The voltage doubler further includes a current output switch module 33, which is adapted to take the first oscillation signal and the third oscillation signal as triggering signals to output the charges stored in the charge storage module 32 via a capacitor.

Figure 11:
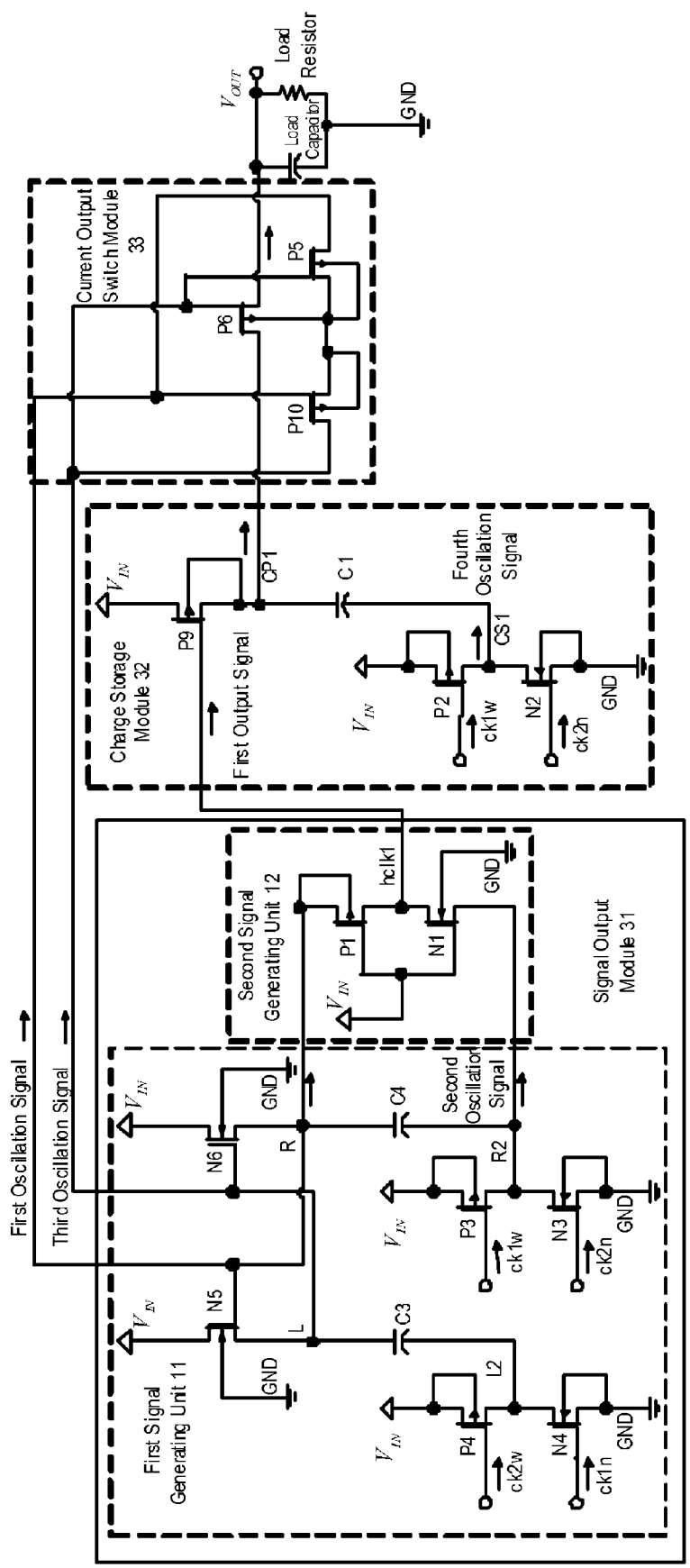
FIG. 11 is a schematic diagram showing a circuit structure of a voltage doubler according to Embodiment 7 of the invention.

The voltage doubler in Embodiment 7 of the invention employs the signal output apparatus in Embodiment 2 and the charge storage module in Embodiment 5, and a schematic diagram of the circuit structure thereof is as shown in FIG. 11.

The voltage doubler in FIG. 11 includes a first signal generating unit 11 and a second signal generating unit 12 in the signal output module 31.

The operating process of the first signal generating unit 11 is as follows.

It is hypothesized that, initially, the voltage differences between the upper and lower plates of the capacitors C3 and C4 are both 0, the phases of the voltages output by the node L2 and the node R2 are opposite, and the two voltages are oscillation signals with a swing of 0 to $V_{IN}$. When the potential of the node L2 is 0 and the potential of the R2 is $V_{IN}$, the voltage differences between the upper and lower plates of the capacitors C4 and C3 are still kept at 0 volt due to the capacitance characteristic, thus initially, the potential of the node L is 0 volt, and the potential of the node R is raised to $V_{IN}$. Then the N5 is conducting, the capacitor C3 is charged by the input voltage $V_{IN}$, and the potential of the node L is pulled up to $V_{IN}$. When the potential of the node L2 is inverted to $V_{IN}$ and the potential of the node R2 is inverted to 0, because the voltage differences between the upper and lower plates of the capacitors C3 and C4 can not be changed at the moment the oscillation signals are inverted, at the moment after inversion, the potential of the node L is pushed up to a voltage of about $2 \times V_{IN}$ due to the ascending of the potential of the node L2, and the potential of the node R is pulled down to 0 due to the descending of the potential of the node R2. In such a case, the N5 is not conducting, while the N6 is conducting because the potential of the gate L is higher than the potential of the node R, thus the potential of the node R is also pulled up to $V_{IN}$. Thereafter, according to the above principle, the voltages of the nodes L and R are opposite phase voltages, and the potentials thereof vary periodically in a range of $V_{IN}$ to about $2 \times V_{IN}$ respectively; the voltages of the nodes L2 and R2 are also opposite phase voltages, and the potentials thereof vary periodically in a range of 0 to $V_{IN}$ respectively. In this embodiment, the oscillation signals output by the nodes R and R2 are taken as the first oscillation signal and the second oscillation signal respectively, and the oscillation signal output by the node L is taken as the third oscillation signal.

The voltage output by the node L2 is obtained via the P4 and the N4 in FIG. 11, the gate of the P4 receives a clock signal ck2w, and the gate of the N4 receives a clock signal ck1n; the voltage output by the node R2 is obtained via the P3 and the N3 in FIG. 11, the gate of the P3 receives a clock signal ck1w, and the gate of the N3 receives a clock signal ck2n, where in the first signal generating unit 11, the ck1w and the ck2w are two-phase non-overlap oscillation signals, the ck1n and the ck2n are two-phase non-overlap oscillation signals, the ck2n and the ck2w are phase-inverted oscillation signals, and the ck1n and the ck1w are phase-inverted oscillation signals.

The specific operating process of the second signal generating unit 12 is as follows.

When the potential of the R2 is 0 and the potential of the R is $V_{IN}$, the N1 is conducting, while the P1 is blocking, and the potential of the first output signal is pulled down to 0 by the N1; when the potential of the R2 is $V_{IN}$ and the potential of the R is about $2 \times V_{IN}$, the N1 is blocking while the P1 is conducting, and the potential of the hclk1 is pulled up to about $2 \times V_{IN}$ by the P1. Thereafter, according to the above principle, the hclk1 oscillates in a range of 0 to about $2 \times V_{IN}$.

The current output switch module 33 in the voltage doubler shown in FIG. 11 includes a tenth PMOS (P10 in FIG. 11), a fifth PMOS (P5 in FIG. 11) and a sixth PMOS (P6 in FIG. 11), where the gate of the tenth PMOS receives a first oscillation signal, one of the source and the drain of the tenth PMOS receives a third oscillation signal, the other one is connected with the bulk of the tenth PMOS, and one of the source and the drain of the tenth PMOS that is connected with the bulk is connected with the source or the drain of the fifth PMOS.

One of the source and the drain of the fifth PMOS that is not connected with the source or the drain of the tenth PMOS receives the first oscillation signal, the gate of the fifth PMOS receives the third oscillation signal, and the bulk of the fifth PMOS is connected with the bulks of the tenth PMOS and the sixth PMOS.

The gate of the sixth PMOS receives the third oscillation signal, the bulk of the sixth PMOS is connected with the bulk of the tenth PMOS, one of the source and the drain of the sixth PMOS is connected with the bulk of the ninth PMOS, and the other one of the source and the drain of the sixth PMOS is connected with the final output terminal, outputs an output voltage $V_{OUT}$ that is higher than the input voltage $V_{IN}$, and outputs a current.

The operating process of the charge storage module 32 and the current output switch module 33 is as follows.

The P9 charging the capacitor C1 in the charge storage module 32 uses the first output signal with a swing between 0 to about $2 \times V_{IN}$ output by the signal output apparatus, i.e., hclk1 in FIG. 11. In a half period of charging, the potential of the node L is about $2 \times V_{IN}$, the P6 in the current output switch module 33 is blocking; the potential of the node hclk1 is 0, the P9 is conducting, the first capacitor C1 is charged by the input voltage $V_{IN}$, and the potential of the upper plate CP1 of C1 may reach up to $V_{IN}$; furthermore, because the potential of the lower plate CS1 of C1 is 0 at this point, the capacitor may be filled with charges up to the hilt. Additionally, the lower plate of C1 may be connected directly with the entity that provides a fourth oscillation signal with a swing of 0 to $V_{IN}$, and in FIG. 11, the P2 and the N2 constitute the entity that generates the fourth oscillation signal, wherein the P2 and the N2 are controlled by using the two-phase non-overlap clock signals ck1w and ck2n.

However, in a half period of discharging, the potential of the lower plate CS1 of C1 is $V_{IN}$, because the voltage difference between the upper and lower plates of C1 can not be changed at the moment the oscillation signal is inverted, at the moment after inversion, the upper plate CP1 of C1 is pushed up to a voltage of about $2 \times V_{IN}$ due to the ascending of the potential of the lower plate CS1; while at this point, the potential of the node L is about $V_{IN}$, P6 in the current output switch module 33 is conducting, and the $V_{OUT}$ is discharged by the C1 via the connection of a load capacitor and a load resistor. Thus it can be seen that, after an operation time long enough, the voltage of the $V_{OUT}$ may be stabilized at about twice of the input voltage $V_{IN}$, and a large current may be output.

Figure 12:
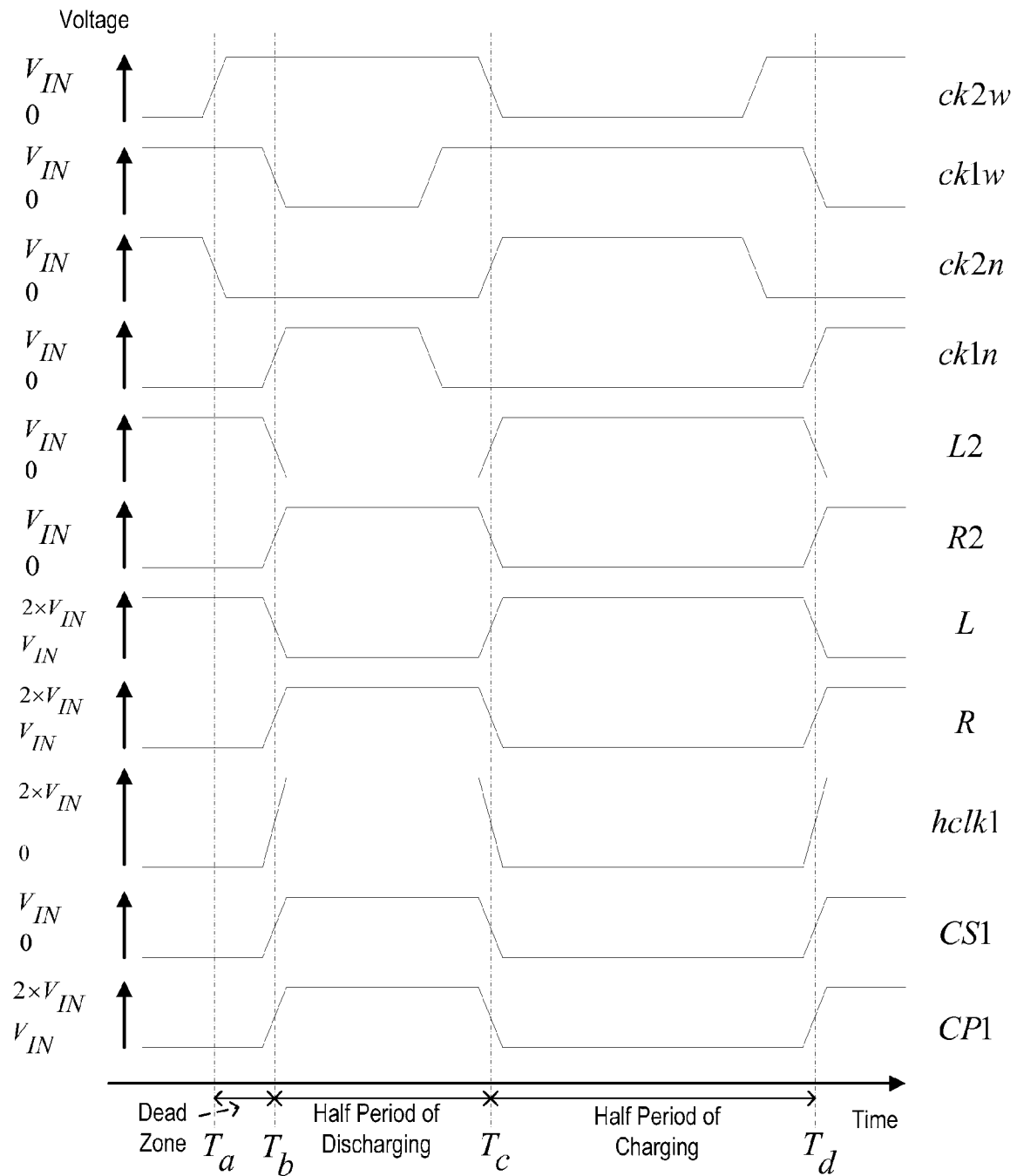
FIG. 12 is a waveform timing diagram of each key node potential during one period in which a circuit works stably according to Embodiment 7 of the invention.

The waveform timing of each key node potential during one period in which a circuit works stably according to Embodiment 7 is as shown in FIG. 12, where a dead zone exists between Ta and Tb, a half period of discharging exists between Tb and Tc, and a half period of charging exists between Tc and Td. The swing and phase of the signal that is output by each node will now be respectively described.

The swings of the ck1w, the ck2w, the ck1n and the ck2n are 0-$V_{IN}$, and the ck1w and the ck2w are two-phase non-overlap oscillation signals, the ck1n and the ck2n are two-phase non-overlap oscillation signals, the ck2n and the ck2w are phase-inverted oscillation signals, and the ck1n and the ck1w are phase-inverted oscillation signals. The signals output by the nodes L2 and R2 have a swing of 0 to $V_{IN}$ and opposite phases. In the half period of discharging, the potential of the L2 is 0 and the potential of the R2 is $V_{IN}$; in the half period of charging, the potential of the L2 is $V_{IN}$ and the potential of the R2 is 0. The signals output by the nodes L and R have a swing of $V_{IN}$ to $2 \times V_{IN}$ and opposite phases. In the half period of discharging, the potential of the L is $V_{IN}$ and the potential of the R is $2 \times V_{IN}$; in the half period of charging, the potential of the L is $2 \times V_{IN}$ and the potential of the R is $V_{IN}$. The signal output by the node hclk1 has a swing of 0 to $2 \times V_{IN}$ and the phase of the signal output by the node hclk1 is the same as that of the signal output by the node R. In the half period of discharging, the potential of the hclk1 is $2 \times V_{IN}$; in the half period of charging, the potential of the hclk1 is 0. The phases of the signals output by the node CS1 and the node CP1 are the same, the swing of the signal output by the CS1 is 0 to $V_{IN}$, and the swing of the signal output by the CP1 is $V_{IN}$ to $2 \times V_{IN}$. In the half period of discharging, the potential of the CS1 is $V_{IN}$, and the potential of the CP1 is $2 \times V_{IN}$; in the half period of charging, the potential of the CS1 is 0 and the potential of the CP1 is $V_{IN}$.

Additionally, in the current output switch module 33 of this embodiment, an oscillation signal with a higher level is alternately selected, by using the switches P5 and P10, from a third oscillation signal and a first oscillation signal with a swing of $V_{IN}$ to about $2 \times V_{IN}$ respectively output from the node L and the node R, to output to the bulks of the P6, P5 and P10, thus ensuring that the well potentials of the P6, P5 and P10 can be kept at about $2 \times V_{IN}$. Furthermore, the charge pump according to this embodiment is applied in the situation of the large current output, and the size of the output switch P6 is relatively large, the parasitic capacitance between the N well and the P-type substrate of the output switch P6 is sufficient to keep the well potential of the output switch P6 at about $2 \times V_{IN}$, thus no additional capacitors need to be added between the bulks of the P6, P5 and P10 and the ground.

Figure 13:
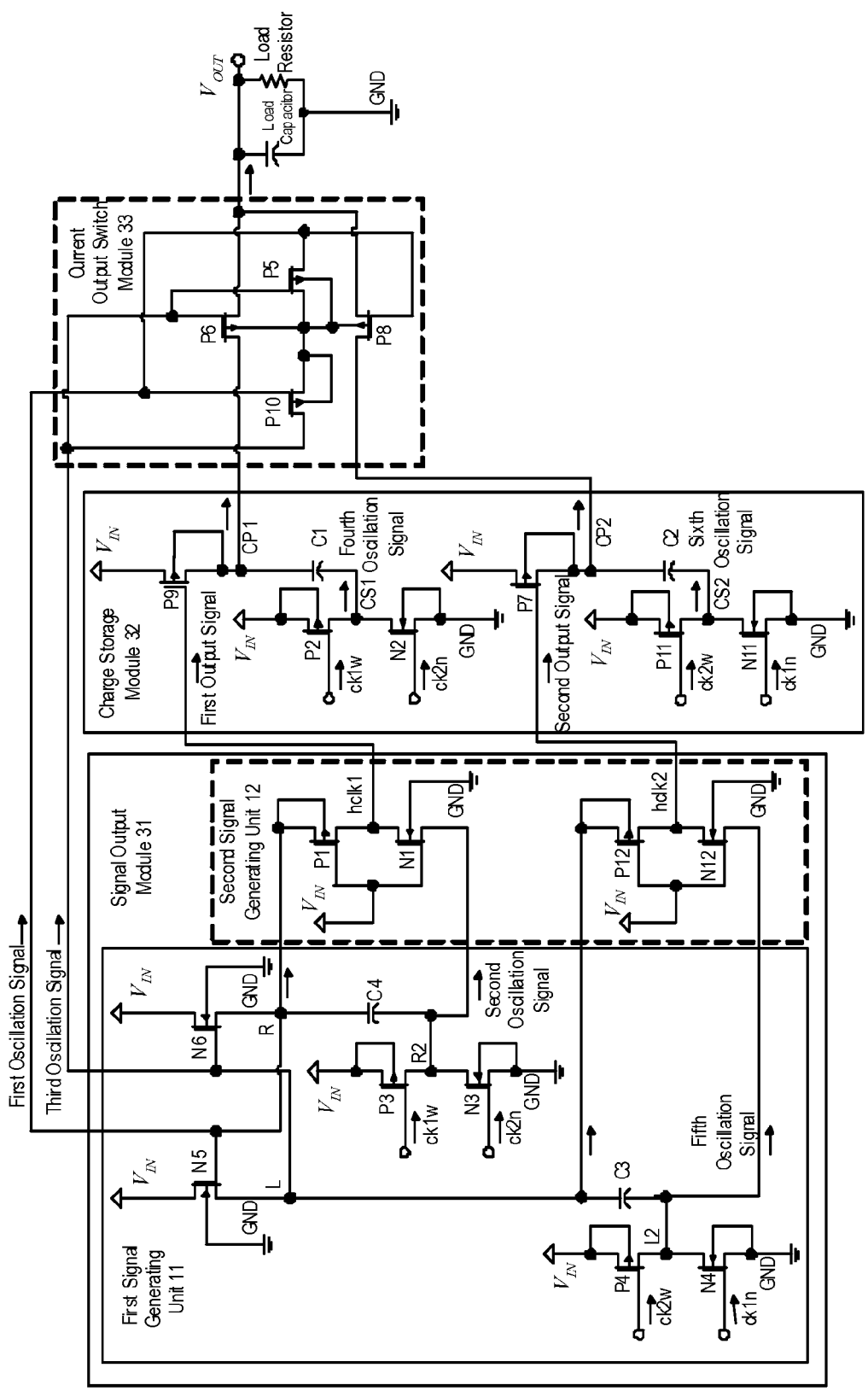
FIG. 13 is a schematic diagram showing a circuit structure of a voltage doubler according to Embodiment 8 of the invention.

The voltage doubler in Embodiment 7 can only output a large current in one half period, and cannot output a current in the other half period. In order to further increase the efficiency of energy output, an improvement is made on the voltage doubler of Embodiment 7. FIG. 13 shows a schematic diagram showing the circuit structure of the voltage doubler according to Embodiment 8 of the invention. The signal output apparatus in this embodiment is similar to that in Embodiment 7, except that the two second signal generating units in Embodiment 2 are combined to obtain a first output signal and a second output signal with a swing of $0 \sim 2 \times V_{IN}$ (corresponding to the two oscillation signals with opposite phases output by the nodes hclk1 and hclk2 in FIG. 13).

The first signal generating unit 11 generates a fifth oscillation signal with a swing of 0 to $V_{IN}$ (the signal output by the node L2 in FIG. 13), and the phases of the fifth oscillation signal and the second oscillation signal are opposite; the second signal generating unit 12 is further adapted to trigger a plurality of self-contained devices connected with the input voltage to be conducting or blocking by using the third oscillation signal (the signal output by the node L in FIG. 13) and the fifth oscillation signal, and to output a second output signal with a swing of 0 to $2 \times V_{IN}$, where the phases of the second output signal and the first output signal are opposite; the charge storage module 32 further includes: a seventh PMOS (P7 in FIG. 13) and a second capacitor (C2 in FIG. 13), where the gate of the seventh PMOS receives the second output signal, one of the source and the drain of the seventh PMOS is connected to the input voltage $V_{IN}$, and the other of the source and the drain is connected to the bulk; one plate of the second capacitor is connected with one of the source and the drain of the seventh PMOS that is connected with the bulk, and the other plate receives a sixth oscillation signal with a swing of 0 to $V_{IN}$, where the phases of the sixth oscillation signal and the second output signal are the same; the current output switch module 33 further includes: an eighth PMOS (P8 in FIG. 13), of which the gate receives the first oscillation signal, and the bulk is connected with the bulk of the sixth PMOS (P6 in FIG. 13); and one of the source and the drain of the eighth PMOS is connected with the bulk of the seventh PMOS (P7 in FIG. 13), and the other of the source and the drain is connected with the output terminal and outputs charges.

The operating process of the first signal generating unit 11 is as follows.

It is hypothesized that, initially, the voltage differences between the upper and lower plates of the capacitors C3 and C4 are both 0, the phases of the voltages output by the node L2 and the node R2 are opposite, and the two voltages are oscillation signals with a swing of 0 to $V_{IN}$. When the potential of the node L2 is 0 and the potential of the R2 is $V_{IN}$, the voltage differences between the upper and lower plates of the capacitors C4 and C3 are still kept at 0 volt due to the capacitance characteristic, thus initially the potential of the node L is 0 volt, and the potential of the node R is raised to $V_{IN}$. Then the N5 is conducting, the capacitor C3 is charged by the input voltage $V_{IN}$, and the potential of the node L is pulled up to $V_{IN}$. When the potential of the node L2 is inverted to $V_{IN}$ and the potential of the node R2 is inverted to 0, because the voltage differences between the upper and lower plates of the capacitors C3 and C4 can not be changed at the moment the oscillation signals are inverted, at the moment after inversion, the potential of the node L is pushed up to a voltage of about $2 \times V_{IN}$ due to the ascending of the potential of the node L2, and the potential of the node R is pulled down to 0 due to the descending of the potential of the node R2. In such a case, the N5 is not conducting, while the N6 is conducting because the potential of the gate L is higher than the potential of the node R, thus the potential of the node R is also pulled up to $V_{IN}$. Thereafter, according to the above principle, the voltages of the nodes L and R are opposite phase voltages, and the potentials thereof vary periodically in a range of $V_{IN}$ to about $2 \times V_{IN}$ respectively; the voltages of the nodes L2 and R2 are also opposite phase voltages, and the potentials thereof vary periodically in a range of 0 to $V_{IN}$ respectively. In this embodiment, the oscillation signals output by the nodes R and R2 are taken as the first oscillation signal and the second oscillation signal respectively, and the oscillation signal output by the node L is taken as the third oscillation signal.

The specific operating process of the second signal generating unit 12 is as follows.

When the potential of the R2 is 0 and the potential of the R is $V_{IN}$, the N1 is conducting, while the P1 is blocking, and the potential of the first output signal (hclk1 in FIG. 13) is pulled down to 0 by the N1; when the potential of the R2 is $V_{IN}$ and the potential of the R is about $2 \times V_{IN}$, the N1 is blocking while the P1 is conducting, and the potential of the hclk1 is pulled up to about $2 \times V_{IN}$ by the P1. Thereafter, according to the above principle, the hclk1 oscillates in a range of 0 to about $2 \times V_{IN}$. By the same token, the oscillation signals output by the node L and the node L2 is output to the P12 and the N12, and the hclk2 is output.

To eliminate the breakover current caused by the simultaneous conducting of metal oxides, and to furthest decrease the power consumption and improve the efficiency of current output, the first signal generating unit generates a second oscillation signal and a fifth oscillation signal by using two-phase non-overlap oscillation signals. Specifically, the first signal generating unit 11 includes: a third PMOS (P3 in FIG. 13), a third NMOS (N3 in FIG. 13), a fourth PMOS (P4 in FIG. 13) and a fourth NMOS (N4 in FIG. 13).

The gate of the third PMOS P3 receives a first clock signal (the ck1w in the first signal generating unit 11 of FIG. 13), and one of the source and the drain receives the input voltage $V_{IN}$ and is connected to the bulk; the gate of the third NMOS N3 receives a second clock signal (the ck2n in the first signal generating unit 11 of FIG. 13), and one of the source and the drain is connected to the bulk; one of the source and the drain of the third PMOS P3 that is not connected with the bulk is connected with one of the source and the drain of the third NMOS N3 that is not connected with the bulk, and the second oscillation signal of the connection point (R2 in FIG. 13) is output.

The gate of the fourth PMOS P4 receives a third clock signal (the ck2w in the first signal generating unit 11 of FIG. 13), and one of the source and the drain receives the input voltage $V_{IN}$ and is connected to the bulk; the gate of the fourth NMOS N4 receives a fourth clock signal (the ck1n in the first signal generating unit 11 of FIG. 13), and one of the source and the drain is connected to the bulk; one of the source and the drain of the fourth PMOS P4 is connected with one of the source and the drain of the fourth NMOS N4 that is not connected with the bulk, and the fifth oscillation signal of the connection point (L2 in FIG. 13) is output.

Where the ck1w and the ck2w are two-phase non-overlap oscillation signals, the ck1n and the ck2n are two-phase non-overlap oscillation signals, the ck2n and the ck2w are phase-inverted oscillation signals, and the ck1n and the ck1w are phase-inverted oscillation signals.

In the charge storage module 32, the node CS1 and the node CS2 respectively output a fourth oscillation signal and a sixth oscillation signal with a swing of 0 to $V_{IN}$ and opposite phases, and the fourth oscillation signal output by the node CS1 is obtained in the following way: the gate of the P2 receives the clock signal ck1w, and one of the source and the drain receives the $V_{IN}$; the gate of the N2 receives the clock signal ck2n, and one of the source and the drain is connected with the bulk and is grounded; one of the source and the drain of the P2 that does not receive the $V_{IN}$ is connected with one of the source and the drain of the N2 that is not connected with the bulk, and the connection point CS1 outputs the fourth oscillation signal. The sixth oscillation signal output by the node CS2 is obtained in the following way: the gate of the eleventh PMOS (P11 in FIG. 13) receives the clock signal ck2w, one of the source and the drain receives the $V_{IN}$; the gate of the eleventh NMOS (N11 in FIG. 13) receives the clock signal ck1n, and one of the source and the drain is connected with the bulk and is grounded; one of the source and the drain of the P11 that does not receive the $V_{IN}$ is connected with one of the source and the drain of the N11 that is not connected with the bulk, and the connection point CS2 outputs the sixth oscillation signal. Where the ck1w and the ck2w are two-phase non-overlap oscillation signals, the ck1n and the ck2n are two-phase non-overlap oscillation signals, the ck2n and the ck2w are phase-inverted oscillation signals, and the ck1n and the ck1w are phase-inverted oscillation signals.

The operating process of the circuit of the voltage doubler is as follows.

During the half period in which the potential of the node hclk1 is 0, the switch P9 is conducting, the first capacitor C1 is charged by the input voltage $V_{IN}$, the potential of the node L is $2 \times V_{IN}$, and the current output switch P6 is blocking; at this point, the potential of the node hclk2 is $2 \times V_{IN}$, the potential of the upper plate CP2 of the second capacitor C2 is $2 \times V_{IN}$, the potential of the node R is $V_{IN}$, the current output switch P8 is conducting, and a large current is output to the node $V_{OUT}$ by the C2 via connecting a load capacitor and a load resistor. During the half period in which the potential of the node hclk1 is $2 \times V_{IN}$, the potential of the upper plate CP1 of C1 is $2 \times V_{IN}$, the potential of the node L is $V_{IN}$, the current output switch P6 is conducting, and a large current is output to the node $V_{OUT}$ by the C1 via connecting a load capacitor and a load resistor; while at this point, the potential of the node hclk2 is 0, the switch P7 is conducting, the C2 is charged by the input voltage $V_{IN}$, the potential of the node R is $2 \times V_{IN}$, and the current output switch P8 is blocking. Additionally, an oscillation signal with a higher level is alternately selected, by using the switches P5 and P10, from a third oscillation signal and a first oscillation signal with a swing of $V_{IN}$ to about $2 \times V_{IN}$ respectively output from the node L and the node R, and is output to the bulks of the P6, P8, P5 and P10, thus ensuring that the well potentials of the P6, P8, P5 and P10 is kept at about $2 \times V_{IN}$.

Figure 14:
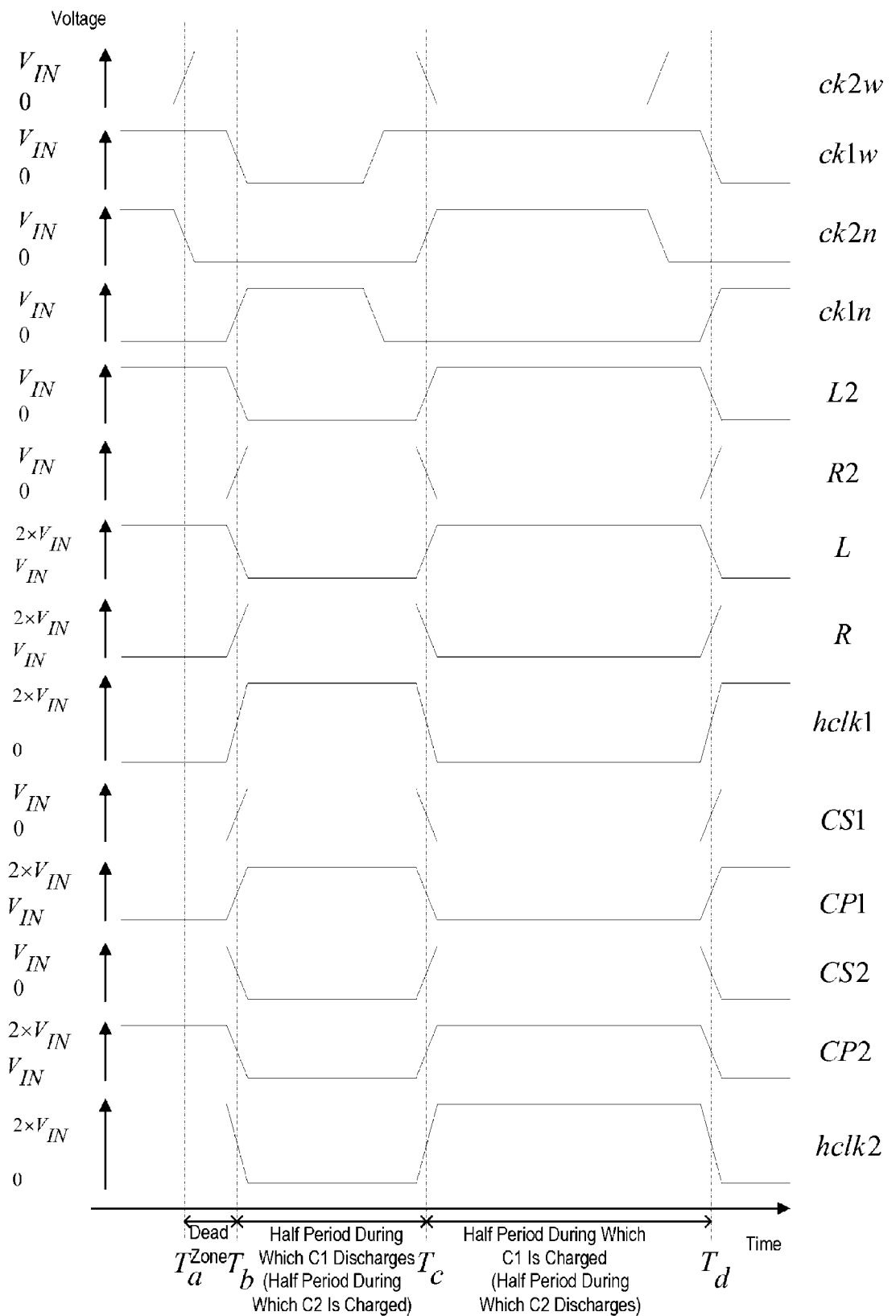
FIG. 14 is a waveform timing diagram of each key node potential during one period in which a circuit works stably according to Embodiment 8 of the invention.

The waveform timing of each key node potential during one period in which a circuit works stably according to Embodiment 8 is as shown in FIG. 14. In this way, a large current is output during each half period; in comparison with Embodiment 7, the charge amount output in one period is doubled, and the output current is also approximately doubled. In FIG. 14, a dead zone exists between Ta and Tb, a half period during which the C1 discharges (a half period during which the C2 is charged) exists between Tb and Tc, and a half period during which the C1 is charged (a half period during which the C2 discharges) exists between Tc and Td.

The swing and phase of the signal that is output by each node will now be respectively described.

The swing of the ck1w, the ck2w, the ck1n and the ck2n is $0$-$V_{IN}$, and the ck1w and the ck2w are two-phase non-overlap oscillation signals, the ck1n and the ck2n are two-phase non-overlap oscillation signals, the ck2n and the ck2w are phase-inverted oscillation signals, and the ck1n and the ck1w are phase-inverted oscillation signals. The signals output by the nodes L2 and R2 have a swing of 0 to $V_{IN}$ and opposite phases, and in the half period during which the C1 discharges (i.e., the half period during which the C2 is charged), the potential of the L2 is 0 and the potential of the R2 is $V_{IN}$; in the half period during which the C1 is charged (i.e., the half period during which the C2 discharges), the potential of the L2 is $V_{IN}$ and the potential of the R2 is 0. The signals output by the nodes L and R have a swing of $V_{IN}$ to $2 \times V_{IN}$ and opposite phases, and in the half period during which the C1 discharges (i.e., the half period during which the C2 is charged), the potential of the L is $V_{IN}$ and the potential of the R is $2 \times V_{IN}$; in the half period during which the C1 is charged (i.e., the half period during which the C2 discharges), the potential of the L is $2 \times V_{IN}$ and the potential of the R is $V_{IN}$. The signals output by the node hclk1 and the node hclk2 have a swing of 0 to $2 \times V_{IN}$ and opposite phases, and in the half period during which the C1 discharges (i.e., the half period during which the C2 is charged), the potential of the hclk1 is $2 \times V_{IN}$ and the potential of the hclk2 is 0; in the half period during which the C1 is charged (i.e., the half period during which the C2 discharges), the potential of the hclk1 is 0 and the potential of the hclk1 is $2 \times V_{IN}$. The signals output by the node CS1 and the node CS2 have a swing of 0 to $V_{IN}$ and opposite phases, and in the half period during which the C1 discharges (i.e., the half period during which the C2 is charged), the potential of the CS1 is $V_{IN}$ and the potential of the CS2 is 0; in the half period during which the C1 is charged (i.e., the half period during which the C2 discharges), the potential of the CS1 is 0 and the potential of the CS2 is $V_{IN}$. The signals output by the node CP1 and the node CP2 have a swing of $V_{IN}$ to $2 \times V_{IN}$ and opposite phases, and in the half period during which the C1 discharges (i.e., the half period during which the C2 is charged), the potential of the CP1 is $2 \times V_{IN}$ and the potential of the CP2 is $V_{IN}$; in the half period during which the C1 is charged (i.e., the half period during which the C2 discharges), the potential of the CP1 is $V_{IN}$ and the potential of the CP2 is $2 \times V_{IN}$.

Figure 15:
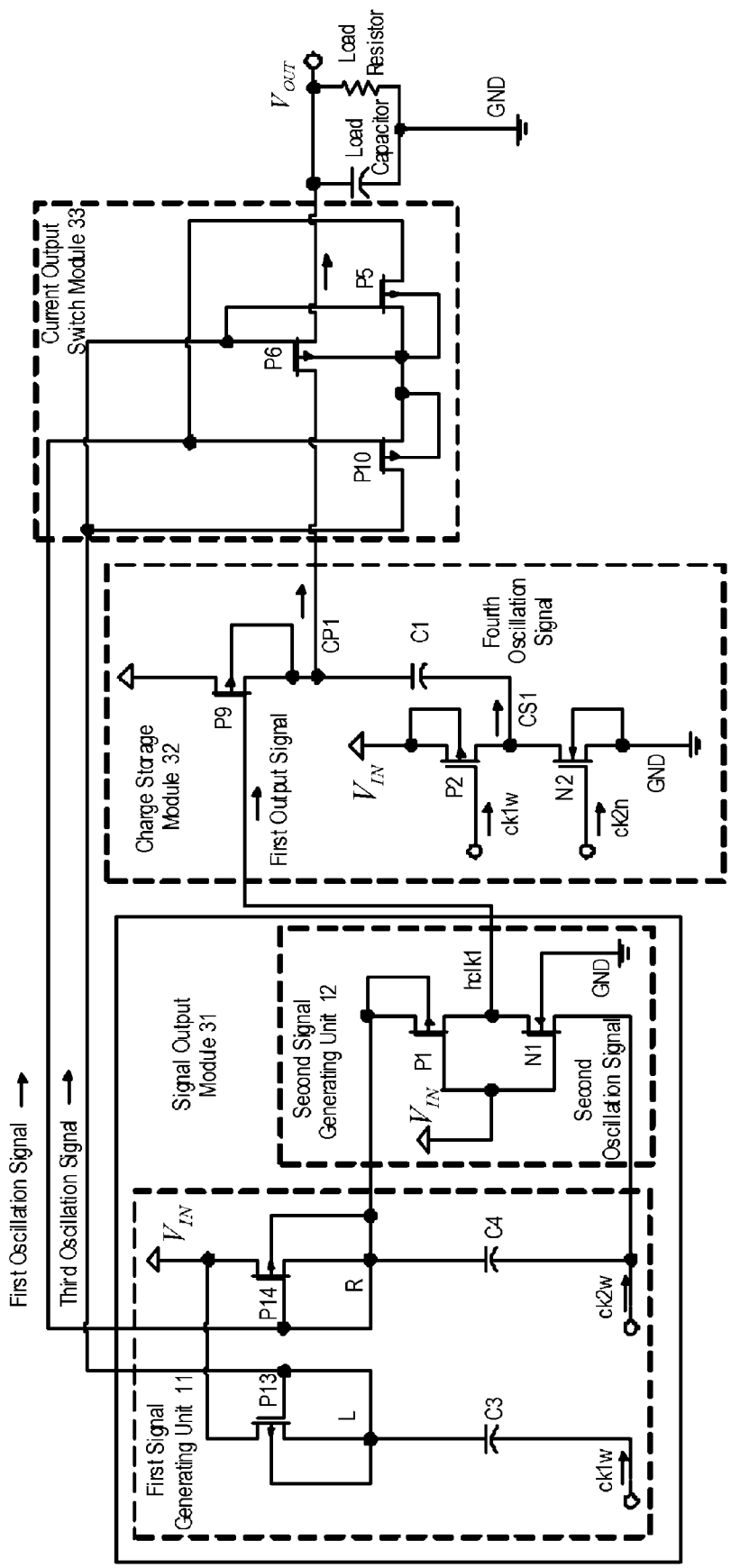
FIG. 15 is a schematic diagram showing a circuit structure of a voltage doubler according to Embodiment 9 of the invention.

FIG. 15 shows a schematic diagram showing the circuit structure of the voltage doubler according to Embodiment 9 of the invention. It is set that the signal output module 31 is the signal output apparatus in Embodiment 3, and that the charge storage module 32 and the current output switch module 33 are the same as those in Embodiment 7.

The operating process of the first signal generating unit 11 in the figure is as follows: it is hypothesized that, initially, the voltage differences between the upper and lower plates of the capacitors C3 and C4 are both 0, and the nodes ck1w and ck2w are two-phase non-overlap clock signals with opposite phases and a swing of 0 volt to $V_{IN}$ volt. To simplify the description of the operating principle, the high level dead zone between the potentials of the nodes ck1w and ck2w is ignored (i.e., it is hypothesized that Tb−Ta=0), and such a simplification will not influence the main operating principle. When the potential of the node ck1w is 0, the potential of the ck2w is $V_{IN}$. The voltage differences between the upper and lower plates of the capacitors C4 and C3 are still kept at 0 due to the capacitance characteristic, thus the potential of the node L is 0, while the potential of the node R is raised to $V_{IN}$. Then the P13 is conducting, the capacitor C3 is charged by the input voltage $V_{IN}$, and the potential of the node L is pulled up to about $V_{IN}$. Then, when the potential of the node ck1w is inverted to $V_{IN}$ while the potential of the node ck2w is inverted to 0, because the voltage differences between the upper and lower plates of the capacitors C3 and C4 can not be changed at the moment the clock signals are inverted, at the moment after inversion, the potential of the node L is pushed up to the potential of about $2 \times V_{IN}$ due to the ascending of the potential of the node ck1w, and the potential of the node R is pulled down to 0 due to the descending of the potential of the node ck2w. In such a case, the P13 is not conducting, while the P14 is conducting because the potential of the gate R is lower than $V_{IN}$, thus the capacitor C4 is charged by the input voltage $V_{IN}$, and the potential of the node R is also pulled up to about $V_{IN}$. Thereafter, according to the above principle, the potentials of the nodes L and R vary periodically in a range of $V_{IN}$ to about $2 \times V_{IN}$ respectively. In this embodiment, the signal output by the node R is taken as the first oscillation signal, the signal output by the ck2w is taken as the second oscillation signal, and the oscillation signal output by the node L is taken as the third oscillation signal.

The operating principle of the second signal generating unit 12 is as follows: when the potential of the ck2w is 0 and the potential of the R is $V_{IN}$, the N1 is conducting while the P1 is blocking, and the potential of the first output signal (labelled as hclk1 in this embodiment) is pulled down to 0 by the N1; when the potential of the ck2w is $V_{IN}$ and the potential of the R is about $2 \times V_{IN}$, the N1 is blocking while the P1 is conducting, and the potential of the hclk1 is pulled up to about $2 \times V_{IN}$ by the P1. Thereafter, according to the above principle, the hclk1 oscillates in a range of 0 to about $2 \times V_{IN}$.

The operating principle of the charge storage module 32 is as follows.

The P9 that charges the capacitor C1 uses the first output signal with a swing of 0 to about $2 \times V_{IN}$, i.e., the hclk1. In the half period of charging, the potential of the node hclk1 is 0, the P9 is conducting, the first capacitor C1 is charged by the input voltage $V_{IN}$, and the potential of the upper plate CP1 of C1 may reach up to $V_{IN}$; furthermore, because the potential of the lower plate CS1 of C1 is 0 at this point, the capacitor may be filled with charges up to the hilt.

However, in the half period of discharging, the potential of the lower plate CS1 of C1 is $V_{IN}$, and because the voltage difference between the upper and lower plates of the C1 can not be changed at the moment the oscillation signal is inverted, at the moment after inversion, the upper plate CP1 of C1 is pushed up to a voltage of about $2 \times V_{IN}$ due to the ascending of the potential of the lower plate CS1.

In this embodiment, the lower plate of the C1 may be connected directly with the entity that provides a fourth oscillation signal with a swing of 0 to $V_{IN}$. For example, in FIG. 15, the P2 and the N2 constitute the entity that generates the fourth oscillation signal, where the P2 and the N2 are controlled using the two-phase non-overlap clock signals ck1w and ck2n, thus the breakover current from the input voltage $V_{IN}$ to the ground, which is generated at the moment the clock signal level is inverted because the P2 and the N2 are conducting at the same time, may be eliminated, the power consumption may be reduced, and the efficiency of energy output of the circuit may be improved.

The operating principle of the current output switch module 33 is as follows.

In the half period of charging, the potential of the node L is about $2 \times V_{IN}$, and the P6 in the current output switch module 33 is blocking; the potential of the node hclk1 is 0, the P9 is conducting, the first capacitor C1 is charged by the input voltage $V_{IN}$, and the potential of the upper plate CP1 of C1 may reach up to $V_{IN}$; furthermore, because the potential of the lower plate CS1 of C1 is 0 at this point, the capacitor may be filled with charges up to the hilt. Additionally, the lower plate of the C1 may be connected directly with the entity that provides a fourth oscillation signal with a swing of 0 to $V_{IN}$, in FIG. 15, the P2 and the N2 constitute the entity that generates the fourth oscillation signal, where the P2 and the N2 are controlled via the two-phase non-overlap clock signals ck1w and ck2n.

However, in the half period of discharging, the potential of the lower plate CS1 of C1 is $V_{IN}$, and because the voltage difference between the upper and lower plates of the C1 can not be changed at the moment the oscillation signal is inverted, at the moment after inversion, the upper plate CP1 of the C1 is pushed up to a voltage of about $2 \times V_{IN}$ due to the ascending of the potential of the lower plate CS1; while at this point, the potential of the node L is about $V_{IN}$, the P6 in the current output switch module 33 is conducting, and charges are output via the C1 by connecting a load capacitor and a load resistor. Thus it can be seen that, after an operation time long enough, the voltage of the $V_{OUT}$ may be stabilized at about twice of the input voltage $V_{IN}$, and a large current may be output.

Additionally, an oscillation signal with a higher level is alternately selected, by using the switches P5 and P10, from a third oscillation signal and a first oscillation signal with a swing of $V_{IN}$ to about $2 \times V_{IN}$ respectively output from the node L and the node R, and is output to the bulks of the P6, P5 and P10, thus ensuring that the well potentials of the P6, P5 and P10 can be kept at about $2 \times V_{IN}$.

Figure 16:
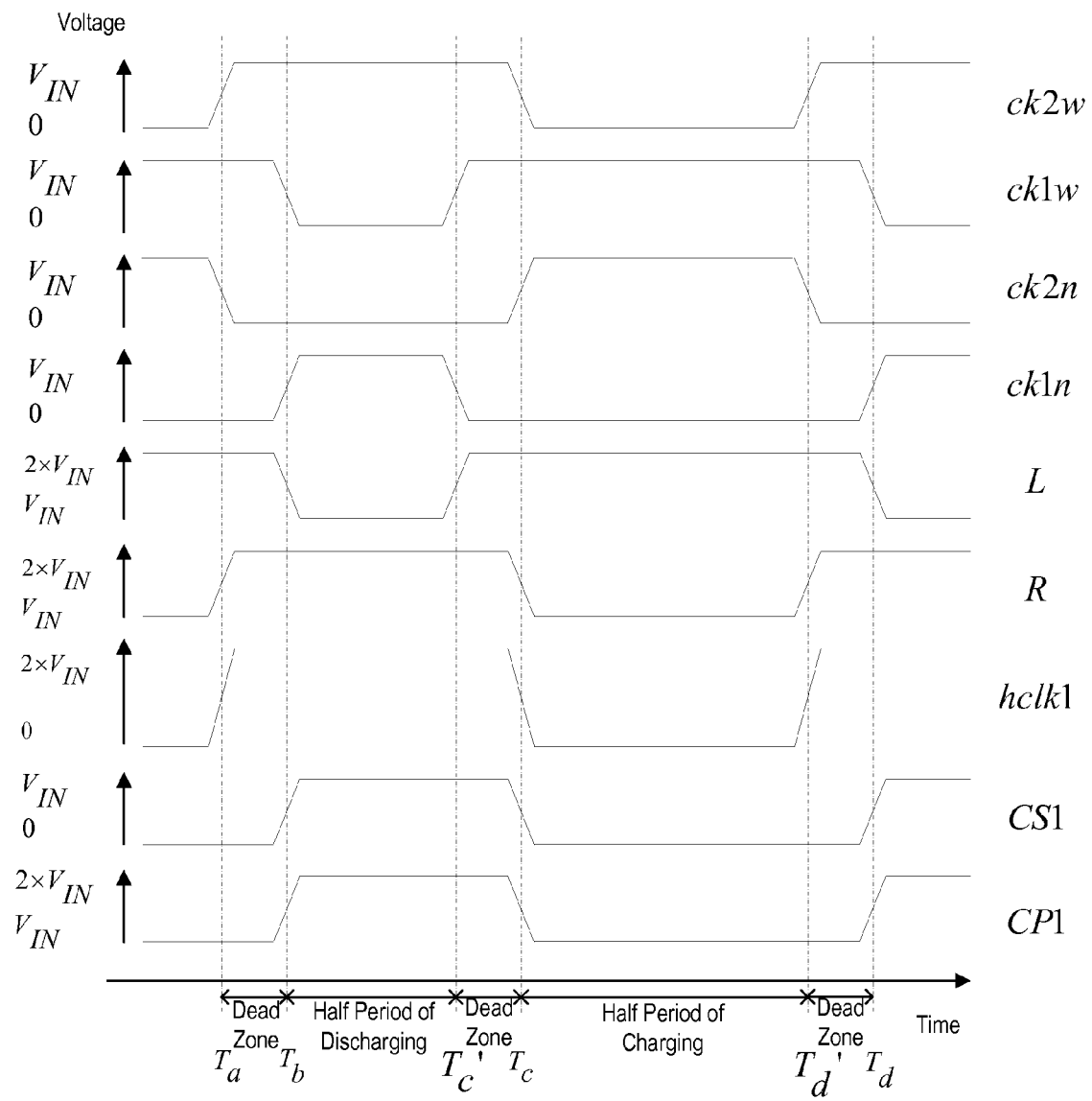
FIG. 16 is a waveform timing diagram of each key node potential during one period in which a circuit works stably according to Embodiment 9 of the invention.

FIG. 16 is a waveform timing diagram of each key node potential during one period in which a circuit works stably according to Embodiment 9. A dead zone exists between Ta and Tb, a half period of discharging exists between Tb and Tc', a dead zone exists between Tc' and Tc, a half period of charging exists between Tc and Td', and a dead zone exists between Td' and Td. The swing and phase of the signal that is output by each node will now be respectively described.

The swing of the ck1w, the ck2w, the ck1n and the ck2n is 0 to $V_{IN}$, and the ck1w and the ck2w are two-phase non-overlap oscillation signals, the ck1n and the ck2n are two-phase non-overlap oscillation signals, the ck2n and the ck2w are phase-inverted oscillation signals, and the ck1n and the ck1w are phase-inverted oscillation signals. The signals output by the nodes L and R have a swing of $V_{IN}$ to $2 \times V_{IN}$ and opposite phases. In the half period of discharging, the potential of the L is $V_{IN}$ and the potential of the R is $2 \times V_{IN}$; in the half period of charging, the potential of the L is $2 \times V_{IN}$ and the potential of the R is $V_{IN}$. The signal output by the node hclk1 has a swing of 0 to $2 \times V_{IN}$, and the phase of the signal output by the node hclk1 is the same as that of the signal output by the node R. In the half period of discharging, the potential of the hclk1 is $2 \times V_{IN}$; in the half period of charging, the potential of the hclk1 is 0. The phases of the signals output by the node CS1 and the node CP1 are the same, the swing of the signal output by the node CS1 is 0 to $V_{IN}$, and the swing of signal output by the node CP1 is $V_{IN}$ to $2 \times V_{IN}$. In the half period of discharging, the potential of the CS1 is $V_{IN}$ and the potential of the CP1 is $2 \times V_{IN}$; in the half period of charging, the potential of the CS1 is 0 and the potential of the CP1 is $V_{IN}$.

In this embodiment, because the nodes L and R are respectively connected to the two-phase non-overlap clock signals ck1w and ck2w via the lower plates of the capacitors C3 and C4, the nodes L and R also output two-phase non-overlap oscillation signals. Such a structure has the following three advantages.

1) Because the charge storage module 32 requires a large current output capacity, the size of the driver of the lower plate of the capacitor in the charge storage module 32 is relatively large. After the two-phase non-overlap clock signals are used, the P2 and the N2 that have large sizes may be blocking simultaneously in the dead zone (between the time Ta and the time Tb as shown in FIG. 16), so that the breakover current from the input voltage $V_{IN}$ to the ground caused by the simultaneous conducting of the P2 and the N2, which have large sizes, may be avoided.

2) Because the signals output by the nodes L and R are two-phase non-overlap oscillation signals with a swing of $V_{IN}$ to $2 \times V_{IN}$, a high level dead zone (between the time Ta and the time Tb as shown in FIG. 16) exists when the two signals oscillate, thus the backflow of charges from the N well of the P6, P5 and P10 to the nodes L and R may be avoided, and this is favorable to keep the high potential of the N well, the conducting of the PN junction between the source/drain of the P6 and the N well of the P6 may be avoided, and thereby reducing the charges leaked to the N well from the CP1 at a high potential, and reducing the charge loss of the charge storage module 32.

3) Because the node hclk1 reaches a high level before the node CP1 reaches a high level (at the time Ta and Tb as shown in FIG. 16), the P9 is blocking, so that the charges flow back from the node CP1 to the $V_{IN}$ may be avoided, thus the charge loss of the charge storage module 32 may be reduced.

Figure 17:
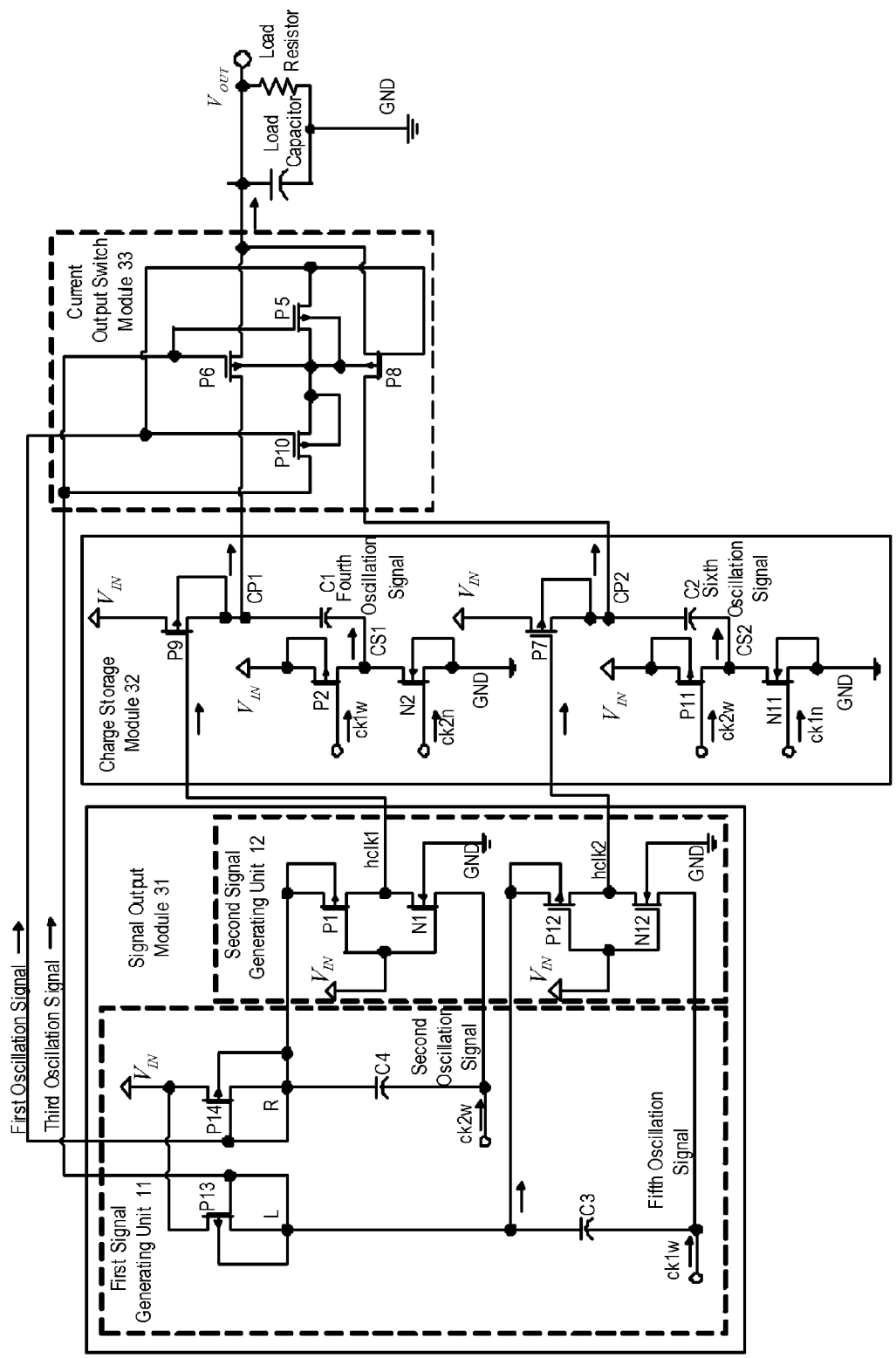
FIG. 17 is a schematic diagram showing a circuit structure of a voltage doubler according to Embodiment 10 of the invention.

As similar to the voltage doubler in Embodiment 7, the voltage doubler in Embodiment 9 can only output a large current in one half period, and cannot output a current in the other half period. In order to further increase the output efficiency, an improvement is made on the charge pump in Embodiment 9. FIG. 17 shows a schematic diagram showing the circuit structure of the voltage doubler according to Embodiment 10 of the invention. In this embodiment, two second signal generating units 12 are combined, and a first output signal and a second output signal with a swing of 0 to $2 \times V_{IN}$ (i.e., the two two-phase non-overlap phase-inverted oscillation signals output by the nodes hclk1 and hclk2 in FIG. 17) are obtained.

The operating process of the first signal generating unit 11 in the figure is as follows.

It is hypothesized that, initially, the voltage differences between the upper and lower plates of the capacitors C3 and C4 are both 0, and the nodes ck1w and ck2w are two-phase non-overlap clock signals with opposite phases and a swing of 0 volt to $V_{IN}$ volt. When the potential of the node ck1w is 0, the potential of the ck2w is $V_{IN}$. The voltage differences between the upper and lower plates of the capacitors C4 and C3 are still kept at 0 due to the capacitance characteristic, thus the potential of the node L is 0, while the potential of the node R is raised to $V_{IN}$. Then the P13 is conducting, the capacitor C3 is charged by the input voltage $V_{IN}$, and the potential of the node L is pulled up to about $V_{IN}$. Then, when the potential of the ck1w is inverted to $V_{IN}$ and the potential of the node ck2w is inverted to 0, because the voltage differences between the upper and lower plates of the capacitors C3 and C4 can not be changed at the moment the clock signals are inverted, at the moment after inversion, the potential of the node L is pushed up to the potential of about $2 \times V_{IN}$ due to the ascending of the potential of the node ck1w, and the potential of the node R is pulled down to 0 due to the descending of the potential of the node ck2w. In such a case, the P13 is not conducting, while the P14 is conducting because the potential of the gate R is lower than $V_{IN}$, thus the capacitor C4 is charged by the input voltage $V_{IN}$, and the potential of the node R is also pulled up to about $V_{IN}$. Thereafter, according to the above principle, the potentials of the nodes L and R periodically vary in a range of $V_{IN}$ to about $2 \times V_{IN}$ respectively. In this embodiment, the signal output by the node R is taken as the first oscillation signal, the signal output by the ck2w is taken as the second oscillation signal, the signal output by the ck1w is taken as the fifth oscillation signal, and the oscillation signal output by the node L is taken as the third oscillation signal.

The operating principle of the second signal generating unit 12 is as follows.

When the potential of the ck2w is 0 and the potential of the R is $V_{IN}$, the N1 is conducting, while the P1 is blocking, and the potential of the first output signal (labelled as hclk1 in this embodiment) is pulled down to 0 by the N1; when the potential of the ck2w is $V_{IN}$ and the potential of the R is about $2 \times V_{IN}$, the N1 is blocking while the P1 is conducting, and the potential of the hclk1 is pulled up to about $2 \times V_{IN}$ by the P1. Thereafter, according to the above principle, the hclk1 oscillates in a range of 0 to about $2 \times V_{IN}$. By the same token, the oscillation signals output by the nodes L and ck1w are output to the P12 and the N12, and the hclk2 is output.

The operating principle of the charge storage module 32 is as follows.

The P9 that charges the capacitor C1 uses the first output signal with a swing of 0 to about $2 \times V_{IN}$, i.e., the hclk1. In the half period of charging, the potential of the node hclk1 is 0, the P9 is conducting, the first capacitor C1 is charged by the input voltage $V_{IN}$, and the potential of the upper plate CP1 of C1 may reach up to $V_{IN}$; furthermore, because the potential of the lower plate CS1 of C1 is 0 at this point, the capacitor may be filled with charges up to the hilt.

However, in the half period of discharging, the potential of the lower plate CS1 of C1 is $V_{IN}$, because the voltage difference between the upper and lower plates of the C1 can not be changed at the moment the oscillation signal is inverted, at the moment after inversion, the upper plate CP1 of the C1 is pushed up to a voltage of about $2 \times V_{IN}$ due to the ascending of the potential of the lower plate CS1. By the same token, the signal of the upper plate CP2 of the C2 is output via the cooperation of the hclk2 and the P7.

In this embodiment, the lower plate of the C1 may be connected directly with the entity that provides a fourth oscillation signal with a swing of 0 to $V_{IN}$. For example, in FIG. 17, the P2 and the N2 constitute the entity that generates the fourth oscillation signal, where the P2 and the N2 are controlled via the two-phase non-overlap clock signals ck1w and ck2n. By the same token, an entity constituted by the P11 and the N11 outputs a sixth oscillation signal at the node C52, where the P11 and the N11 are controlled by using the two-phase non-overlap clock signals ck2w and ck1n.

The operating principle of the current output switch module 33 is as follows.

During the half period in which the potential of the node hclk1 is 0, the switch P9 is conducting, the first capacitor C1 is charged by the input voltage $V_{IN}$, the potential of the node L is $2 \times V_{IN}$, and the current output switch P6 is blocking; at this point, the potential of the node hclk2 is $2 \times V_{IN}$, the potential of the upper plate CP2 of the second capacitor C2 is $2 \times V_{IN}$, the potential of the node R is $V_{IN}$, the current output switch P8 is conducting, and a large current is output to the node $V_{OUT}$ by the C2 via connecting a load capacitor and a load resistor. During the half period in which the potential of the node hclk1 is $2 \times V_{IN}$, the potential of the upper plate CP1 of the C1 is $2 \times V_{IN}$, the potential of the node L is $V_{IN}$, the current output switch P6 is conducting, and a large current is output to the node $V_{OUT}$ via the C1 by connecting a load capacitor and a load resistor; while at this point, the potential of the node hclk2 is 0, the switch P7 is conducting, the C2 is charged by the input voltage $V_{IN}$, the potential of the node R is $2 \times V_{IN}$, and the current output switch P8 is blocking. Additionally, an oscillation signal with a higher level is alternately selected, by using the switches P5 and P10, from a third oscillation signal and a first oscillation signal with a swing of $V_{IN}$ to about $2\times V_{IN}$ respectively output from the node L and the node R, and is output to the bulks of the P6, P8, P5 and P10, thus ensuring that the well potentials of the P6, P8, P5 and P10 are kept at about $2\times V_{IN}$.

Figure 18:
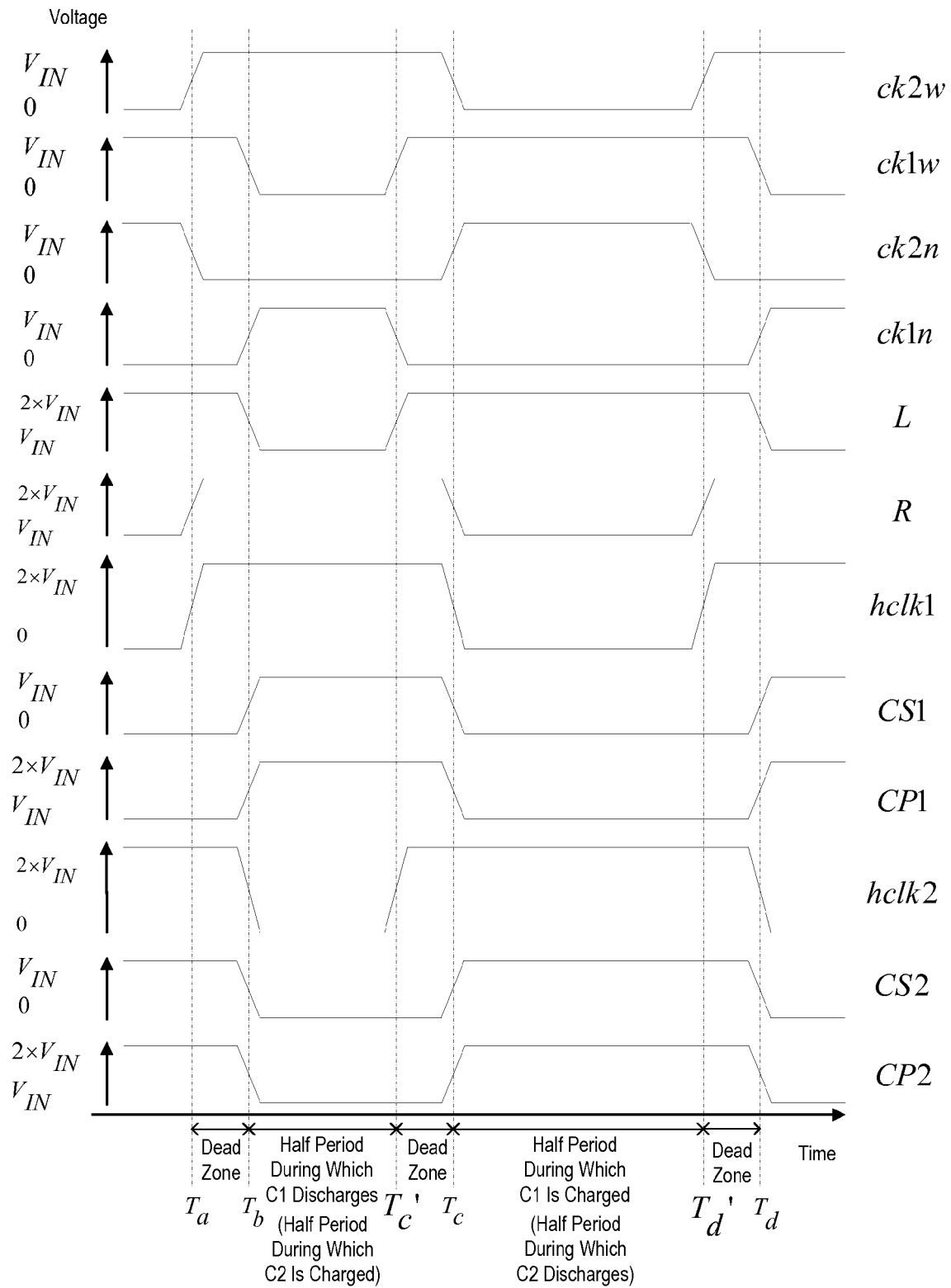
FIG. 18 is a waveform timing diagram of each key node potential during one period in which a circuit works stably according to Embodiment 10 of the invention.

The waveform timing of each key node potential during one period in which a circuit works stably according to Embodiment 10 is as shown in FIG. 18. A dead zone exists between Ta and Tb, a half period during which the C1 discharges (a half period during which the C2 is charged) exists between Tb and Tc', a dead zone exists between Tc' and Tc, a half period during which the C1 is charged (a half period during which the C2 discharges) exists between Tc and Td', and a dead zone exists between Td' and Td. The swing and phase of the signal that is output by each node will now be respectively described.

The swing of the ck1w, the ck2w, the ck1n and the ck2n is 0 to $V_{IN}$, and the ck1w and the ck2w are two-phase non-overlap oscillation signals, the ck1n and the ck2n are two-phase non-overlap oscillation signals, the ck2n and the ck2w are phase-inverted oscillation signals, and the ck1n and the ck1w are phase-inverted oscillation signals. The signals output by the nodes L and R have a swing of $V_{IN}$ to $2\times V_{IN}$ and opposite phases. In the half period during which the C1 discharges (i.e., the half period during which the C2 is charged), the potential of the L is $V_{IN}$ and the potential of the R is $2\times V_{IN}$; and in the half period during which the C1 is charged (i.e., the half period during which the C2 discharges), the potential of the L is $2\times V_{IN}$ and the potential of the R is $V_{IN}$. The signals output by the node hclk1 and the node hclk2 have a swing of 0 to $2\times V_{IN}$ and opposite phases. In the half period during which the C1 discharges (i.e., the half period during which the C2 is charged), the potential of the hclk1 is $2\times V_{IN}$ and the potential of the hclk2 is 0; in the half period during which the C1 is charged (i.e., the half period during which the C2 discharges), the potential of the hclk1 is 0 and the potential of the hclk2 is $2\times V_{IN}$. The signals output by the node CS1 and the node CS2 have a swing of 0 to $V_{IN}$ and opposite phases. In the half period during which the C1 discharges (i.e., the half period during which the C2 is charged), the potential of the CS1 is $V_{IN}$ and the potential of the CS2 is 0; and in the half period during which the C1 is charged (i.e., the half period during which the C2 discharges), the potential of the CS1 is 0 and the potential of the CS2 is $V_{IN}$. The signals output by the node CP1 and the node CP2 have a swing of $V_{IN}$ to $2\times V_{IN}$ and opposite phases. In the half period during which the C1 discharges (i.e., the half period during which the C2 is charged), the potential of the CP1 is $2\times V_{IN}$ and the potential of the CP2 is $V_{IN}$; in the half period during which the C1 is charged (i.e., the half period during which the C2 discharges), the potential of the CP1 is $V_{IN}$ and the potential of the CP2 is $2\times V_{IN}$.

Thus, a large current is output during each half period. In comparison with Embodiment 9, the charge amount output in one period is doubled, and the output current is also approximately doubled.

In addition to obtaining the same effects as Embodiment 9, Embodiment 10 further has the following advantages.

Because the voltages of the signals output by the nodes L and R have a swing of $V_{IN}$ to $2\times V_{IN}$ and opposite phases and the two signals are two-phase non-overlap oscillation signals, a high level dead zone (between the time Ta and the time Tb as shown in FIG. 18) exists when the two signals oscillate, thus the problem that the charges flow back from the CP1 (or the CP2) with a high potential to the CP2 (or the CP1) with a low potential via the $V_{OUT}$ and the well shared by the P6, P8, P5 and P10 due to the simultaneous conducting of the switches P6 and P8 and the switches P5 and P10 when the ordinary inverted clock signal is inverted may be solved.

According to the above description of each embodiment of the invention, Embodiment 11 of the invention further provides a method for outputting a large current, which includes the following processes:

Process 1: generating three oscillation signals, where the first oscillation signal has a swing of $V_{IN}$ to $2\times V_{IN}$, the second oscillation signal has a swing of 0 to $V_{IN}$, the phases of the first oscillation signal and the second oscillation signal are the same, and the third oscillation signal and the first oscillation signal have the same swing and opposite phases;

Process 2: taking the first oscillation signal and the second oscillation signal as triggering signals, converting the input voltage to a first output signal with a swing of 0 to $2\times V_{IN}$ and outputting the first output signal, where the phases of the first output signal and the first oscillation signal are the same;

Process 3: taking the first output signal as a triggering signal to generate two states, where one state is to charge one plate of a capacitor by an input voltage $V_{IN}$, and the other state is to provide a voltage higher than 0 volt to the other plate of the capacitor; and Process 4: taking the first oscillation signal and the third oscillation signal as triggering signals to output the charges on the plate of the capacitor.

Finally, it should be noted that, in each embodiment of the invention, the circuit structure is described by taking the MOS (for example, MOS field effect transistor (MOSFET) and Enhanced MOSFET) as an example. Additionally, other types of transistors, such as Bipolar Transistor, may also be used in the circuit provided in the invention. Moreover, the objects of the invention may also be attained by using a plurality of diodes and triodes put in circuit.

By using the signal output apparatus, the charge pump, the voltage doubler and the method for outputting a current according to the embodiments of the invention, under the premise that a standard CMOS manufacturing process is used and the voltage differences born by the lead wires between the gate and the source, the source and the drain and the gate and the drain of all the MOS devices should not exceed $V_{IN}$ when a charge pump-type voltage doubler works stably, it may be ensured that the MOS is not fragile to be destroyed by the electrostatic discharge or latchup introduced via each pin of the chip, and at the same time, the waste on the charges output by the charge pump may be reduced; additionally, because the two-phase non-overlap oscillation signals are used, the charge loss may be avoided to the maximum extent, and the efficiency of energy output of the circuit may be improved.

It will be appreciated that one skilled in the art may make various modifications and alterations to the present invention without departing from the spirit and scope of the present invention. Accordingly, if these modifications and alterations to the present invention fall within the scope of the claims of the present invention and their equivalents, the present invention intends to include all these modifications and alterations.

What is claimed is:
1. A charge pump, comprising:
a signal output module, adapted to output a first output signal with a swing of 0 to $2\times V_{IN}$; and
a charge storage module, adapted to take the first output signal as a triggering signal to generate two states, wherein one state is to charge one plate of a capacitor by an input voltage $V_{IN}$, and the other state is to provide a voltage higher than 0 volt to the other plate of the capacitor, wherein the signal output module comprises:
a first signal generating unit, adapted to generate a first oscillation signal with a swing of input voltage $V_{IN}$ to $2\times V_{IN}$ and a second oscillation signal with a swing of 0 to $V_{IN}$ and a phase the same as that of the first oscillation signal; and
a second signal generating unit, adapted to take the first oscillation signal and the second oscillation signal as triggering signals, convert the input voltage to a first output signal with a swing of 0 to $2\times V_{IN}$ and output the first output signal, wherein the phases of the first output signal and the first oscillation signal are the same.

2. The charge pump of claim 1 wherein, the first signal generating unit comprises:
a PMOS, of which the gate receives a first clock signal ck1w, and the source receives the input voltage $V_{IN}$ and is connected to the bulk; and
an NMOS, of which the gate receives a second clock signal ck2n, and the source is grounded and connected to the bulk;
wherein the drain of the PMOS is connected with the drain of the NMOS and the second oscillation signal at the connection point is output, and the first clock signal ck1w and the second clock signal ck2n are two-phase non-overlap oscillation signals.

3. The charge pump of claim 1, wherein, the second signal generating unit comprises:
a PMOS, of which the gate receives the input voltage $V_{IN}$, and the source is connected with the bulk and receives the first oscillation signal; and
an NMOS, of which the source receives the second oscillation signal, the bulk is grounded, and the gate receives the input voltage $V_{IN}$;
wherein the drain of the PMOS is connected with the drain of the NMOS and the first output signal at the connection point is output.

4. The charge pump of claim 1, wherein, the first signal generating unit is further adapted to generate a third oscillation signal with an opposite phase but the same swing as the first oscillation signal.

5. The charge pump of claim 1, wherein, the charge storage module comprises:
a PMOS, of which the gate receives the first output signal, one of the source and the drain receives the input voltage $V_{IN}$, and the other is connected with the bulk,
wherein one plate of the capacitor is connected with one of the source and drain of the PMOS that is connected with the bulk, and the other plate of the capacitor receives a fourth oscillation signal with a swing of 0 to $V_{IN}$, and
wherein the phases of the fourth oscillation signal and the first output signal are the same.

6. The charge pump of claim 5, wherein, the charge storage module further comprises:
a second PMOS, of which the gate receives a first clock signal ck1w, and the source and the bulk receives the input voltage $V_{IN}$; and
an NMOS, of which the gate receives a second clock signal ck2n, and the source and the bulk are grounded;
wherein the drain of the NMOS is connected with the drain of the second PMOS, the connection point outputs the fourth oscillation signal, and the first clock signal ck1w and the second clock signal ck2n are two-phase non-overlap oscillation signals.

7. A voltage doubler, comprising:
a signal output module, adapted to output a first output signal with a swing of 0 to $2\times V_{IN}$, and a first oscillation signal and a third oscillation signal with the same swing of $V_{IN}$ to $2\times V_{IN}$ but with opposite phases;
a charge storage module, adapted to take the first output signal as a triggering signal to generate two states, wherein one state is to charge one plate of a first capacitor by an input voltage $V_{IN}$, and the other state is to provide a voltage higher than 0 volt to the other plate of the first capacitor; and
a current output switch module, adapted to take the first oscillation signal and the third oscillation signal as triggering signals and output the charges stored in the charge storage module via the first capacitor.

8. The voltage doubler of claim 7, wherein, the signal output module comprises:
a first signal generating unit, adapted to generate a first oscillation signal with a swing of $V_{IN}$ to $2\times V_{IN}$, a second oscillation signal with a swing of 0 to $V_{IN}$ and a phase the same as that of the first oscillation signal, and a third oscillation signal with a swing the same as that of the first oscillation signal but with an opposite phase; and
a second signal generating unit, adapted to take the first oscillation signal and the second oscillation signal as triggering signals, convert the input voltage to a first output signal with a swing of 0 to $2\times V_{IN}$ and output the first output signal, wherein the phases of the first output signal and the first oscillation signal are the same.

9. The voltage doubler of claim 8, wherein, the second signal generating unit comprises:
a first PMOS, of which the gate receives the input voltage $V_{IN}$, and the source is connected with the bulk and receives the first oscillation signal; and
a first NMOS, of which the source receives the second oscillation signal, the bulk is grounded, and the gate receives the input voltage $V_{IN}$;
wherein the drain of the first PMOS is connected with the drain of the first NMOS and the first output signal at the connection point is output.

10. The voltage doubler of claim 8, wherein, the charge storage module comprises:
a ninth PMOS, of which the gate receives the first output signal, one of the source and the drain receives the input voltage $V_{IN}$, and the other is connected to the bulk; and
a first capacitor, of which one plate is connected with one of the source and drain of the ninth PMOS that is connected with the bulk, and the other plate receives a fourth oscillation signal with a swing of 0 to $V_{IN}$, wherein the phases of the fourth oscillation signal and the first output signal are the same.

11. The voltage doubler of claim 10, wherein, the charge storage module further comprises:
a second PMOS, of which the gate receives a first clock signal ck1w, and the source and the bulk receives the input voltage $V_{IN}$; and
a second NMOS, of which the gate receives a second clock signal ck2n, and the source and the bulk are grounded;
wherein the drain of the second NMOS is connected with the drain of the second PMOS, the connection point outputs the fourth oscillation signal, and the first clock signal ck1w and the second clock signal ck2n are two-phase non-overlap oscillation signals.

12. The voltage doubler of claim 10, wherein, the current output switch module comprises: a tenth PMOS, a fifth PMOS and a sixth PMOS, wherein:
the gate of the tenth PMOS receives the first oscillation signal, one of the source and the drain receives the third oscillation signal, and the other is connected with the bulk;

one of the source and the drain of the tenth PMOS that is connected with the bulk is connected with the source or the drain of the fifth PMOS;

one of the source and the drain of the fifth PMOS that is not connected with the source or the drain of the tenth PMOS receives the first oscillation signal, and the gate receives the third oscillation signal;

the bulk of the fifth PMOS is connected with the bulk of the tenth PMOS and the bulk of the sixth PMOS; and the gate of the sixth PMOS receives the third oscillation signal, one of the source and the drain is connected with the bulk of the ninth PMOS, and the other is connected with the output terminal and outputs charges.

13. The voltage doubler of claim 12, wherein, the first signal generating unit is further adapted to generate a fifth oscillation signal with a swing of 0 to $V_{IN}$, wherein the fifth oscillation signal and the second oscillation signal have opposite phases;

the second signal generating unit is further adapted to take the third oscillation signal and the fifth oscillation signal as triggering signals, convert the input voltage to a second output signal with a swing of 0 to $2\times V_{IN}$ and output the second output signal, wherein the second output signal and the first output signal have opposite phases;

the charge storage module further comprises:

a seventh PMOS, of which the gate receives the second output signal, one of the source and the drain receives the input voltage $V_{IN}$, and the other is connected to the bulk;

a second capacitor, of which one plate is connected with one of the source and the drain of the seventh PMOS that is connected with the bulk, the other plate receives a sixth oscillation signal with a swing of 0 to $V_{IN}$, wherein the phase of the sixth oscillation signal is the same as that of the second output signal;

the current output switch module further comprises: an eighth PMOS, of which the gate receives the first oscillation signal, and the bulk is connected with the bulk of the sixth PMOS; and one of the source and the drain of the eighth PMOS is connected with the bulk of the seventh PMOS, and the other is connected with the output terminal and outputs charges.

14. The voltage doubler of claim 13, wherein, the charge storage module further comprises:

an eleventh PMOS, of which the gate receives a third clock signal ck2w, and the source and the bulk receive the input voltage $V_{IN}$; and an eleventh nMOS, of which the gate receives a fourth clock signal ck1n, and the source and the bulk are grounded;

wherein the drain of the eleventh nMOS is connected with the drain of the eleventh PMOS, the connection point outputs the sixth oscillation signal, and the third clock signal ck1w and the fourth clock signal ck2n are two-phase non-overlap oscillation signals.

15. The voltage doubler of claim 13, wherein, the first signal generating unit comprises:

a third PMOS, of which the gate receives a first clock signal ck1w, and the source receives the input voltage $V_{IN}$ and is connected to the bulk; and a third nMOS, of which the gate receives a second clock signal ck2n, and the source is grounded and connected to the bulk;

wherein the drain of the third PMOS is connected with the drain of the third nMOS and the second oscillation signal at the connection point is output.

16. The voltage doubler of claim 15, wherein, the first signal generating unit further comprises:

a fourth PMOS, of which the gate receives a third clock signal ck2w, and the source receives the input voltage $V_{IN}$ and is connected to the bulk; and a fourth nMOS, of which the gate receives a fourth clock signal ck1n, and the source is grounded and connected to the bulk;

the drain of the fourth PMOS is connected with the drain of the fourth nMOS, and the fifth oscillation signal at the connection point is output;

wherein the first clock signal and the third clock signal are two-phase non-overlap oscillation signals, the second clock signal and the fourth clock signal are two-phase non-overlap oscillation signals, the first clock signal and the fourth clock signal are phase-inverted oscillation signals, and the second clock signal and the third clock signal are phase-inverted oscillation signals.

17. A method for outputting a current, comprising:

generating a first oscillation signal with a swing of $V_{IN}$ to $2\times V_{IN}$, a second oscillation signal with a swing of 0 to $V_{IN}$ and a phase the same as that of the first oscillation signal, and a third oscillation signal with a swing the same as that of the first oscillation signal but with an opposite phase;

taking the first oscillation signal and the second oscillation signal as triggering signals, converting the input voltage to a first output signal with a swing of 0 to $2\times V_{IN}$ and outputting the first output signal, wherein the phases of the first output signal and the first oscillation signal are the same;

taking the first output signal as a triggering signal to generate two states, wherein one state is to charge one plate of a first capacitor by the input voltage $V_{IN}$, and the other state is to provide a voltage higher than 0 volt to the other plate of the first capacitor; and taking the first oscillation signal and the third oscillation signal as triggering signals to output the charges on the plate of the first capacitor.

18. The method of claim 17, further comprising:

generating a fifth oscillation signal with a swing of 0 to $V_{IN}$, wherein the fifth oscillation signal and the second oscillation signal have opposite phases;

taking the third oscillation signal and the fifth oscillation signal as triggering signals, converting the input voltage to a second output signal with a swing of 0 to $2\times V_{IN}$ and outputting the second output signal, wherein the second output signal and the first output signal have opposite phases;

taking the second output signal as a triggering signal to generate two states, wherein one state is to charge one plate of a second capacitor by the input voltage $V_{IN}$, and the other state is to provide a voltage higher than 0 volt to the other plate of the second capacitor; and taking the first oscillation signal and the third oscillation signal as triggering signals to output the charges on the plate of the second capacitor.

* * * * *